United States Patent
Lee et al.

(10) Patent No.: US 10,214,422 B2
(45) Date of Patent: Feb. 26, 2019

(54) INTERLAYER DISTANCE CONTROLLED GRAPHENE, SUPERCAPACITOR AND METHOD OF PRODUCING THE SAME

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Keun Sik Lee, Bucheon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 722 days.

(21) Appl. No.: 14/515,010

(22) Filed: Oct. 15, 2014

(65) Prior Publication Data
US 2015/0103469 A1    Apr. 16, 2015

(30) Foreign Application Priority Data

Oct. 16, 2013   (KR) .................. 10-2013-0123456
Jan. 16, 2014   (KR) .................. 10-2014-0005458

(51) Int. Cl.
*H01G 11/52*    (2013.01)
*C01B 31/04*    (2006.01)
(Continued)

(52) U.S. Cl.
CPC ........ *C01B 31/0446* (2013.01); *C01B 32/184* (2017.08); *H01G 11/36* (2013.01); *H01G 11/52* (2013.01); *Y02E 60/13* (2013.01)

(58) Field of Classification Search
CPC ........ H01G 11/28; H01G 11/04; H01G 11/42; H01G 11/32; H01G 9/028; H01G 9/042
See application file for complete search history.

(56) References Cited

U.S. PATENT DOCUMENTS

| | | | |
|---|---|---|---|
| 8,945,772 B2* | 2/2015 | Kawakami | ............ H01M 4/131 |
| | | | 429/223 |
| 2005/0075245 A1* | 4/2005 | Goddard, III | .......... B82Y 30/00 |
| | | | 502/417 |

(Continued)

FOREIGN PATENT DOCUMENTS

| KR | 10-1221979 B1 | 1/2013 |
|---|---|---|
| WO | WO 2012/098345 A2 | 7/2012 |

OTHER PUBLICATIONS

Pillared Graphene: A Three Dimensional Carbon Nanotube/ Graphene Sandwich and its Application as Electrode in Supercapacitors. 2010, 22 pp. 3723-3728.*

(Continued)

*Primary Examiner* — Nguyen T Ha
(74) *Attorney, Agent, or Firm* — NSIP Law

(57) ABSTRACT

A method of producing interlayer distance controlled graphene, an interlayer distance controlled graphene composition, and a supercapacitor are provided. A method of producing an interlayer distance controlled graphene involves dispersing a graphene oxide in a solution by using a surfactant, forming a reduced graphene oxide by adding a reducing agent into the solution containing the dispersed graphene oxide, and adding a pillar material that is activated at its both ends by a $N_2^+$ group into the solution containing the reduced graphene oxide to control an interlayer distance of the reduced graphene oxide.

23 Claims, 35 Drawing Sheets

(51) Int. Cl.
*H01G 11/36* (2013.01)
*C01B 32/184* (2017.01)

(56) References Cited

U.S. PATENT DOCUMENTS

| | | | | |
|---|---|---|---|---|
| 2011/0121264 A1* | 5/2011 | Choi | B82Y 10/00 | 257/14 |
| 2011/0186789 A1* | 8/2011 | Samulski | B82Y 30/00 | 252/514 |
| 2012/0049136 A1* | 3/2012 | Sano | H01B 1/127 | 252/519.33 |
| 2012/0077080 A1* | 3/2012 | Liu | H01G 11/06 | 429/206 |
| 2012/0116094 A1* | 5/2012 | Swager | A24D 3/163 | 548/256 |
| 2012/0164539 A1* | 6/2012 | Zhamu | H01M 4/0445 | 429/300 |
| 2012/0302683 A1* | 11/2012 | Ku | C09C 1/44 | 524/186 |
| 2013/0302697 A1* | 11/2013 | Wang | B82Y 30/00 | 429/300 |
| 2014/0346046 A1* | 11/2014 | Andelman | C02F 1/4691 | 204/554 |
| 2015/0221409 A1* | 8/2015 | Wu | D01D 5/08 | 252/78.3 |

OTHER PUBLICATIONS

Kim, Byung Hoon, et al. "Investigation on the existence of optimum interlayer distance for H 2 uptake using pillared-graphene oxide." international journal of hydrogen energy 37.19 (2012): 14217-14222.

Huang, Ping, et al. "Graphene covalently binding aryl groups: conductivity increases rather than decreases." ACS nano 5.10 (2011): 7945-7949.

Pu, Nen-Wen, et al. "Dispersion of graphene in aqueous solutions with different types of surfactants and the production of graphene films by spray or drop coating." Journal of the Taiwan Institute of Chemical Engineers 43.1 (2012): 140-146.

* cited by examiner

INTERLAYER DISTANCE CONTROLLED GRAPHENE, SUPERCAPACITOR AND METHOD OF PRODUCING THE SAME

CROSS-REFERENCE TO RELATED APPLICATION

This application claims the benefit under 35 USC 119(a) of Korean Patent Application No. 10-2013-0123456 filed on Oct. 16, 2013 and Korean Patent Application No. 10-2014-0005458 filed on Jan. 16, 2014, in the Korean Intellectual Property Office, the entire disclosures of which are incorporated herein by reference for all purposes.

BACKGROUND

1. Field

The following description relates to a method for manufacturing interlayer distance controlled graphene, an interlayer distance controlled graphene composition, and a supercapacitor including graphene with the interlayer distance controlled as an electrode material.

2. Description of Related Art

Graphene is a crystalline allotrope of carbon with two-dimensional properties. Other allotropes of carbon include diamond, graphite, carbon nanotube, bukyball, and the like. Graphene comprises a monolayer of carbon atoms arranged within a pattern of repeating honeycomb lattices in two dimensions. Graphene has attracted attention by researchers by virtue of its electronic, optical, thermal, and mechanical properties. Graphene is utilized on applications to field-effect transistors (FET), memory devices, supercapacitors, transparent electrodes, sensors, and so on. In particular, the utilization of graphene has been studied as electrode materials for electrochemical capacitors (ECs), which are sometimes represented to as supercapacitors or ultracapacitors, due to its large specific surface area, high conductivity, and excellent electrochemical stability.

Graphene can be prepared by various methods such as mechanical exfoliation, chemical exfoliation, chemical vapor deposition, epitaxial synthesis, and the like. Among these methods, the chemical exfoliation is a method of reducing back the graphite derivative after oxidizing the graphite with an oxidizing agent. The chemical exfoliation is a low-cost method and makes it possible to mass-produce graphene, thereby leading to a high possibility of industrial applications thereof. The oxidized graphene has an advantage of being easily utilized with its aqueous dispersibility.

To date, studies have been made on improving the capacity of supercapacitors, in particular, on enhancing the electrical storage capability by increasing effective areas of electrode materials. Electrode materials of supercapacitors that have been marketed are mainly an active carbon, which is insufficient for implementing a supercapacitor with bulk storage since its electrical conductivity is poor and its active areas actually in use are small even though the specific surface area thereof is large. The capacity of the supercapacitor is proportional to the area of an electrode plate. However, when the area increases, the total size of the supercapacitor increases, and hence it is required to maintain an optimum level of the surface area of electrode plate. Under this circumstance, it has been studied to replace the active carbon with carbon nanotubes. In this regard, Korean Patent Application Publication No. 1221979 relates to a method for manufacturing carbon nanotubes applicable to supercapacitors and supercapacitors containing the same. When manufacturing a supercapacitor by using said carbon nanotubes, it is possible to enhance supercapacitor properties by virtue of the excellent conductivity, broad surface area, chemical stability, etc. of the carbon nanotubes. However, the carbon nanotubes have their own limitations in respect that the price is high in itself and it is difficult to manufacture carbon nanotubes with a high quality to a degree suitable for mass production, and so forth.

To this end, studies have been conducted on the application by using graphene having excellent electrical conductivity and specific surface area onto supercapacitors. However, graphene aggregates by itself, and the interlayer distance of graphene is narrow, with approximately 0.35 nm between two layers. Therefore, the shortcoming of graphene is its lack of covering thus-produced electrical charge double layer, at the time of the application of graphene as supercapacitor electrodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of preparing an interlayer distance controlled graphene involves: dispersing a graphene oxide in a solution by using a surfactant; forming a reduced graphene oxide by adding a reducing agent into the solution containing the dispersed graphene oxide; adding a pillar material that is activated at its both ends by a N2+ group into the solution containing the reduced graphene oxide to control an interlayer distance of the reduced graphene oxide.

The pillar material may include an organic molecule comprising one or more selected from the group consisting of aryl group, alkyl group, vinyl group, allylic group, alcohol group, phenyl group, anthracene, naphthalene, pyrene, tetracene, coronene, and combinations thereof, or includes a molecule containing an inorganic material selected from the group consisting of C60 or C70 buckminsterfullerene, iron oxide, copper oxide, manganese oxide, ferrocene, vanadocene, rhodocene, and combinations thereof.

The general aspect of the method may further include performing an ultrasonication treatment to homogenize the dispersed graphene oxide, after adding the surfactant.

The general aspect of the method may further include performing a filtration to remove aggregates that are formed after adding the pillar material.

The surfactant may include a member selected from the group consisting of sodium C10-16-alkyl benzene sulfonate, sodium C10-16-alkyl sulfate, polyacrylic acid, and combinations thereof.

The reducing agent may include a member selected from the group consisting of hydrazine, hydroiodic acid, sodium borohydride, ascorbic acid, sodium hydroxide, potassium hydroxide, and combinations thereof.

The pillar material comprises a member selected from the group consisting of a bis-diazonium salt, a diazonium salt, and combinations thereof.

The reduced graphene oxide and the pillar material may be crosslinked by binding the molecule contained in the pillar material with the reduced graphene oxide.

The solution comprising the reduced graphene oxide comprises a solvent selected from the group consisting of water, dimethyl formamide, N-methyl pyrroldine, ethanol, dimethyl sulfoxide, and combinations thereof.

The interlayer distance in the graphene may be controlled by a type of the pillar material, a size of the molecule contained in the pillar material or both the type of the pillar material and the size of the molecule contained in the pillar material.

In another general aspect, a supercapacitor includes an anode and a cathode arranged opposite to each other; a separator membrane formed between the anode and the cathode; and an electrolyte. The anode or the cathode may include an interlayer distance controlled graphene prepared by the method described above.

The electrolyte may include a member selected from the group consisting of an aqueous electrolyte, an organic electrolyte, and combinations thereof.

The separator membrane may be a porous separator membrane that passes an ion.

In another general aspect, a graphene composition may include a plurality of graphene sheets stacked on each other, a pillar group comprising an aromatic structure covalently bonded to two adjacent graphene sheets to control an interlayer distance between the two adjacent graphene sheets.

The aromatic structure may include a six-membered carbon ring covalently bonded to a first graphene sheet at one end of the aromatic structure and covalently bonded to a second graphene sheet or another six-membered carbon ring at a para position thereof.

The aromatic structure may include two or more six-membered carbon rings covalently bonded to each other at a C1 position or C4 position such that the two or more six-membered carbon rings form a linear linkage disposed between the two adjacent graphene sheets.

Other features and aspects will be apparent from the following detailed description, the drawings, and the claims.

BRIEF DESCRIPTION OF THE DRAWINGS

FIG. 9A is a graph showing a cyclic voltammetry curve in scan rate at about 10 mV/s.

FIG. 9B is a graph showing Nyquist plot in the frequency range from about 0.01 Hz to about 100 kHz with about 10 mV ac amplitude (wherein inset indicates magnified data at high-frequency region).

FIG. 9C is a graph showing a galvanostatic charge-discharge curve with the current density of about 0.1 A/g.

FIG. 9D is a graph showing a tendency of specific capacitance.

Figure 1A:
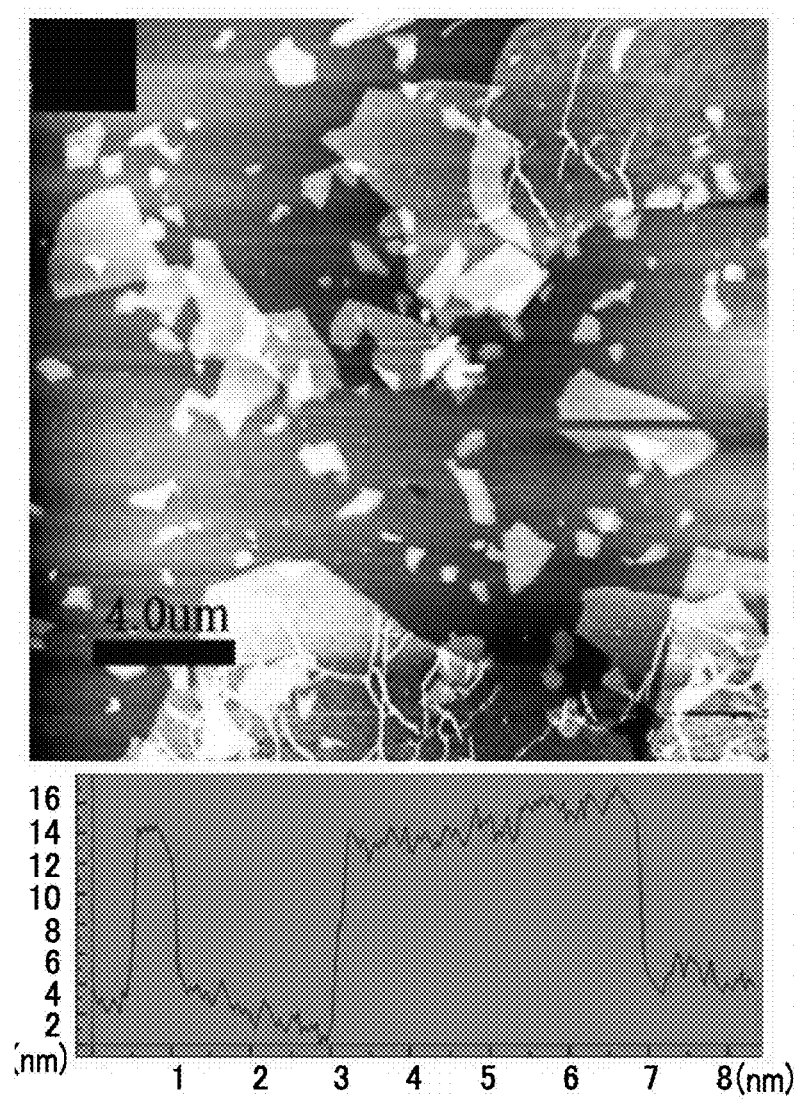
FIG. 1A is an atomic force microscopic image of a graphene oxide (GO) according to an example of a method of producing interlayer distance controlled graphene.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the disclosure, the terms "connected to" or "coupled to" are used to designate a connection or coupling of one element to another element and include both a case where an element is "directly connected or coupled to" another element and a case where an element is "electronically connected or coupled to" another element via still another element.

Throughout the disclosure, the term "on" that is used to designate a position of one element with respect to another element includes both a case that the one element is adjacent to the another element and a case that any other element exists between these two elements.

Throughout the disclosure, the term "comprises or includes" and/or "comprising or including" used in the document means that one or more other components, steps, operations, and/or the existence or addition of elements are not excluded in addition to the described components, steps, operations and/or elements. Throughout the whole document of the present disclosure, the terms "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document of the present disclosure, the term "step of" does not mean "step for."

Throughout the disclosure, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the disclosure, the expression "A and/or B" means "A or B, or A and B."

Hereinafter, illustrative embodiments and examples of the present disclosure will be described in detail with reference to the accompanying drawings. However, the present disclosure may not be limited to the illustrative embodiments, the examples and the drawings.

The first aspect of the present disclosure provides a method of producing an interlayer distance controlled graphene, the method involving: adding a surfactant into a solution containing a graphene oxide (hereinafter, also referred to as 'GO') to disperse the graphene oxide; adding a reducing agent into a solution containing the dispersed graphene oxide to form a reduced graphene oxide (hereinafter, also referred to as 'rGO'); and adding a pillar material which is activated at its both ends by a $N_2^+$ group into the solution containing the reduced graphene oxide to control the interlayer distance of the reduced graphene oxide.

In accordance with an illustrative embodiment of the present disclosure, the pillar material may include an organic molecule containing one or more selected from the group consisting of an aryl group, an alkyl group, a vinyl group, an allylic group, an alcohol group, a phenyl group, anthracene, naphthalene, pyrene, tetracene, coronene, and combinations thereof, or may include an inorganic material in form of a nanoparticle or a nanorod of metalic oxides selected from the group consisting of $C_{60}$ or $C_{70}$ buckminsterfullerene (hereinafter, also referred to as 'buckyball'), iron oxide, copper oxide, manganese oxide, and combinations thereof, and may include an inorganic material selected from the group consisting of ferrocene, vanadocene, rhodocene, and combinations thereof, but may not be limited thereto.

In accordance with an illustrative embodiment of the present disclosure, further comprises an ultrasonic treatment to homogenize the dispersed graphene oxide, after adding the surfactant, but may not be limited thereto.

In accordance with an illustrative embodiment of the present disclosure, further comprises a filtration to remove aggregates which are formed after adding the pillar material, but may not be limited thereto.

In accordance with an illustrative embodiment of the present disclosure, the surfactant may include a member selected from the group consisting of sodium $C_{10-16}$-alkyl benzene sulfonate, sodium $C_{10-16}$-alkyl sulfate, polyacrylic acid, and combinations thereof, but may not be limited thereto. For example, the sodium $C_{10-16}$-alkyl benzene sulfonate and the sodium $C_{10-16}$-alkyl sulfate may be sodium dodecylbenzenesulfonate (hereinafter, referred to as 'SDBS') and sodium dodecylsulfate (SDS). For example, it can be adding a surfactant which prevents the recombination of the graphene oxide to make the graphene oxide stably dispersed, but may not be limited thereto.

In accordance with an illustrative embodiment of the present disclosure, the reducing agent may include a member selected from the group consisting of hydrazine, hydroiodic acid (HI), sodium borohydride ($NaBH_4$), ascorbic acid (vitamin C), sodium hydroxide (NaOH), potassium hydroxide (KOH), and combinations thereof, but may not be limited thereto.

In accordance with an illustrative embodiment of the present disclosure, the pillar material may include a member selected from a group consisting of a bis-diazonium salt, a diazonium salt, and combinations thereof, but may not be limited thereto.

In accordance with an illustrative embodiment of the present disclosure, the reduced graphene oxide and the pillar material may be cross-linked by binding the molecule contained in the pillar material reduced graphene oxide, but may not be limited thereto.

In accordance with an illustrative embodiment of the present disclosure, the solution containing the reduced graphene oxide may include a solvent selected from the group consisting of water, dimethyl formamide (DMF), N-methyl pyrroldine (NMP), ethanol, dimethyl sulfoxide (DMSO), and combinations thereof, but may not be limited thereto.

In accordance with an illustrative embodiment of the present disclosure, the interlayer distance between two sheets of graphene may be controlled by a type of the pillar material and/or a size of the molecule contained in the pillar material, but the disclosure may not be limited thereto. For instance, the graphene layer may be controlled to have an interlayer distance of from about 0.4 nm to about 20 nm, but the distance may not be limited thereto. The graphene layer, for example, may be controlled to have an interlayer distance of from about 0.4 nm to about 20 nm, from about 1 nm to about 20 nm, from about 5 nm to about 20 nm, from about 10 nm to about 20 nm, from about 15 nm to about 20 nm, from about 0.4 nm to about 15 nm, from about 1 nm to about 15 nm, from about 5 nm to about 15 nm, from about 10 nm to about 15 nm, from about 0.4 nm to about 10 nm, from about 1 nm to about 10 nm, from about 5 nm to about 10 nm, from about 0.4 nm to about 5 nm, from about 1 nm to about 5 nm, or from about 0.4 nm to about 1 nm, but may not be limited thereto.

In accordance with an illustrative embodiment of the present disclosure, all synthesis processes according to the present disclosure may be progressed in liquid state, but the disclosure may not be limited thereto. As the whole synthesis processes according to illustrative embodiment of the present disclosure are progressed in liquid state, the reaction can easily occur, and the confirmation of the reaction is also easy, and thus may be adequate for mass production; however, the disclosure may not be limited thereto.

The second aspect of the present disclosure is to provides a supercapacitor comprising an anode and a cathode arranged opposite to each other; a separator membrane formed between the anode and the cathode; and an electrolyte, wherein the anode and/or the cathode includes the interlayer distance controlled graphene prepared according to the first aspect of the present disclosure.

In accordance with an illustrative embodiment of the present disclosure, the electrolyte may include one selected from the group consisting of an aqueous electrolyte, an organic electrolyte, and combinations thereof, but the disclosure may not be limited thereto. For instance, the electrolyte may include a member selected from the group consisting of KOH, $H_2SO_4$, HCl, $Li_2SO_4$, NaOH, $Na_2SO_4$, 1-ethyl-3-methylimidazolium tetrafluoroborate ($EMIMBF_4$), tetraethylammonium tetrafluoroborate ($TEABF_4$), 1-ethyl-3-methylimidazolium bis(trifluoromethylsulfonyl)imide (EMITFSI), and combinations thereof, but may not be limited thereto.

In accordance with an illustrative embodiment of the present disclosure, the separator membrane may be a porous separator membrane which pass an ion, but the embodiment may not be limited thereto.

It may be possible to compare the difference between capacitor capacitance depending on the interlayer distance of graphene by using the interlayer distance controlled graphene as an electrode material of supercapacitor, and it may be possible to prepare a capacitor with capacitance required depending on the interlayer distance of graphene. Further, the interlayer distance controlled graphene facilitates the movement of electrolytes, thereby increasing the active area of electrode material; however, the disclosure may not be limited thereto.

In accordance with the illustrative embodiments, the interlayer distance controlled graphene can be mass-produced by employing mass-producible graphene oxide as a starting material. Since the whole process of synthesis in accordance with the present disclosure is progressed at a state of solution, the reaction is simple and also easily confirmed.

The interlayer distance controlled graphene in accordance with the illustrative embodiments can readily control the interlayer distance of the graphene by inserting a pillar material that fixes the interlayer distance between two adjacent sheets of graphene. An organic material can be used as the pillar material and the insertion of the pillar material between graphene leads to prevent the aggregation of the graphene and to maintaining a constant interlayer distance of the graphene therebetween. Additionally, the input and output of electrolyte gets a benefit from the spacing formed by the controlled interlayer distance of graphene, and hence the electrochemical property of graphene becomes more excellent than that of common graphene.

The utilization of the interlayer distance controlled graphene in accordance with the illustrative embodiments as electrode materials of a supercapacitor makes it possible to compare the difference between capacitance of capacitors according to the interlayer distance of graphene. It is also possible to prepare a supercapacitor with a capacitance required depending on the distance of the graphene. In addition, the application of a graphene material having a constant interlayer distance to a supercapacitor can increase effective areas of electrode materials in electrolyte movement. In addition, because of using carbon-based organic materials rather than metals, the material is expected to exhibit greater bio-compatibility with human body than metallic materials.

Hereinafter, various examples of the present disclosure are described. However, the examples are provided for illustrative purposes to assist in understanding of the present disclosure, and the present disclosure is not limited to the examples.

EXAMPLES

1. Preparation of Graphene Oxide (GO) Solution

Graphene oxide (GO) was prepared from natural graphite by way of a modified-Hummer's method that utilizes sulfuric acid, potassium permanganate, and sodium nitrate. As shown in FIG. 1A, atomic force microscopy (AFM) was used to show GO sheets.

Figure 1B:
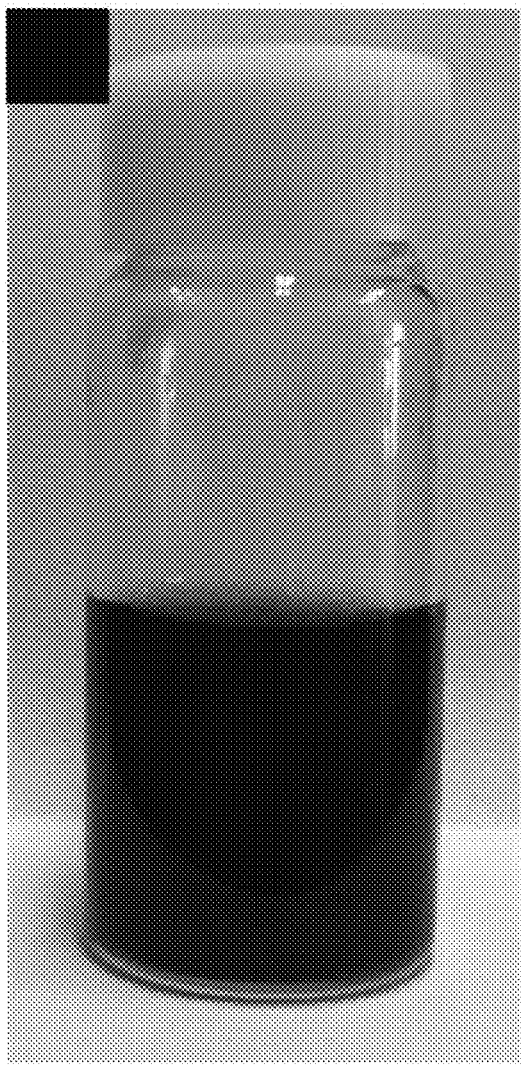
FIG. 1B is an optical image of dispersed GO in water according to the example of the method of FIG. 1A.

The GO (20 mg) was dispersed in 20 mL of distilled water at room temperature [FIG. 1B], and was ultrasonicated for one hour. The resulting homogenous solution is shown in FIG. 1B.

2. Preparation of Dispersed rGO

Figure 1C:
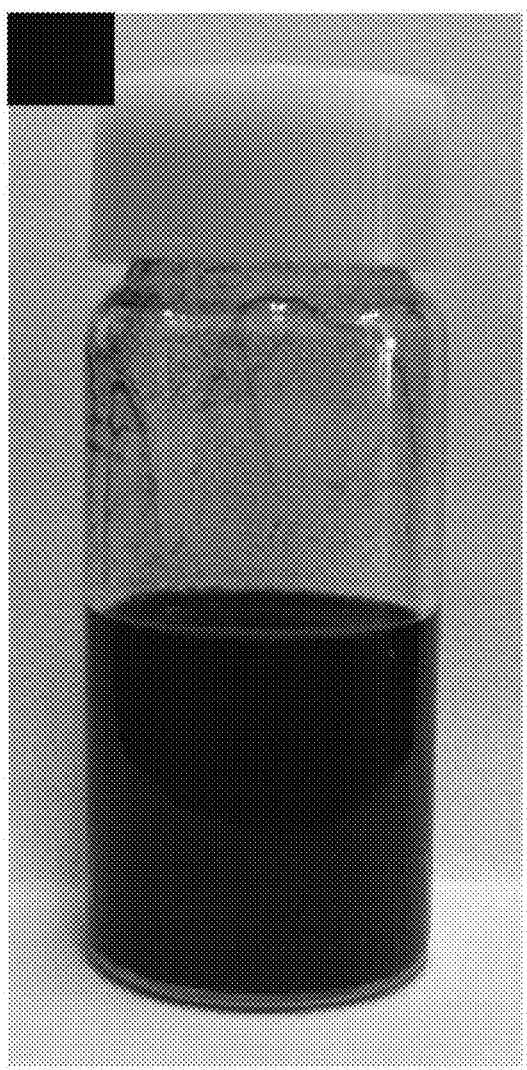
FIG. 1C is an optical image of the SDBS-dissolved reduced graphene oxide (rGO) after a week, respectively, according to the example of the method of FIG. 1A.

The surfactant-wrapped dispersion of reduced graphene oxide (rGO) was based on prior researches for chemically converted graphene sheets, and a surfactant was used to disperse rGO in a solution and to clarify the reaction between the surface of the rGO and organic materials. As a surfactant 1 wt % sodium dodecylbenzenesulfonate (SDBS) was added in GO solution (1 mg/mL), and homogenized by ultrasonication for one hour. The pH was adjusted to 10 by using an aqueous solution of 10 M NaOH while checking levels with pH paper. The prepared GO solution was reduced using 30% hydrazine hydrate (0.4 mL) at 90° C. for 24 hours. As illustrated in FIG. 1C, SDBS-wrapping rGO was dispersed well in water even after one week. The obtained solution was filtered using cotton to remove aggregates.

3. Synthesis of Bis-Diazonium Salt 1 (BD1)

In a 50 mL round-bottom flask was added p-phenylenediamine (0.200 g, 1.8 mmol) (Aldrich) dissolved in dry $CH_2Cl_2$, boron trifluoride etherate (2 eq.) (Aldrich), and isoamyl nitrite (1.6 eq.) (TCI) below 0° C. The resulting mixture was kept stirring for thirty minutes to a precipitate washed with ether to obtain a product.

All reagents were purchased from Sigma Aldrich.

4. Synthesis of Bis-Diazonium Salt 2 (BD 2)

Synthesis of BD2 was performed in the same procedure as in the aforementioned synthesis process for BD 1 by using benzidine (Aldrich) in place of p-phenylenediamine.

5. Synthesis of Bis-Diazonium Salt 3 (BD 3)

Synthesis of BD3 was performed in the same procedure as in the aforementioned synthesis process for BD 1 by using 4,4"-diamino-p-terphenyl (by TCI) in place of p-phenylenediamine.

6. Preparation of rGO-BD

Figure 2:
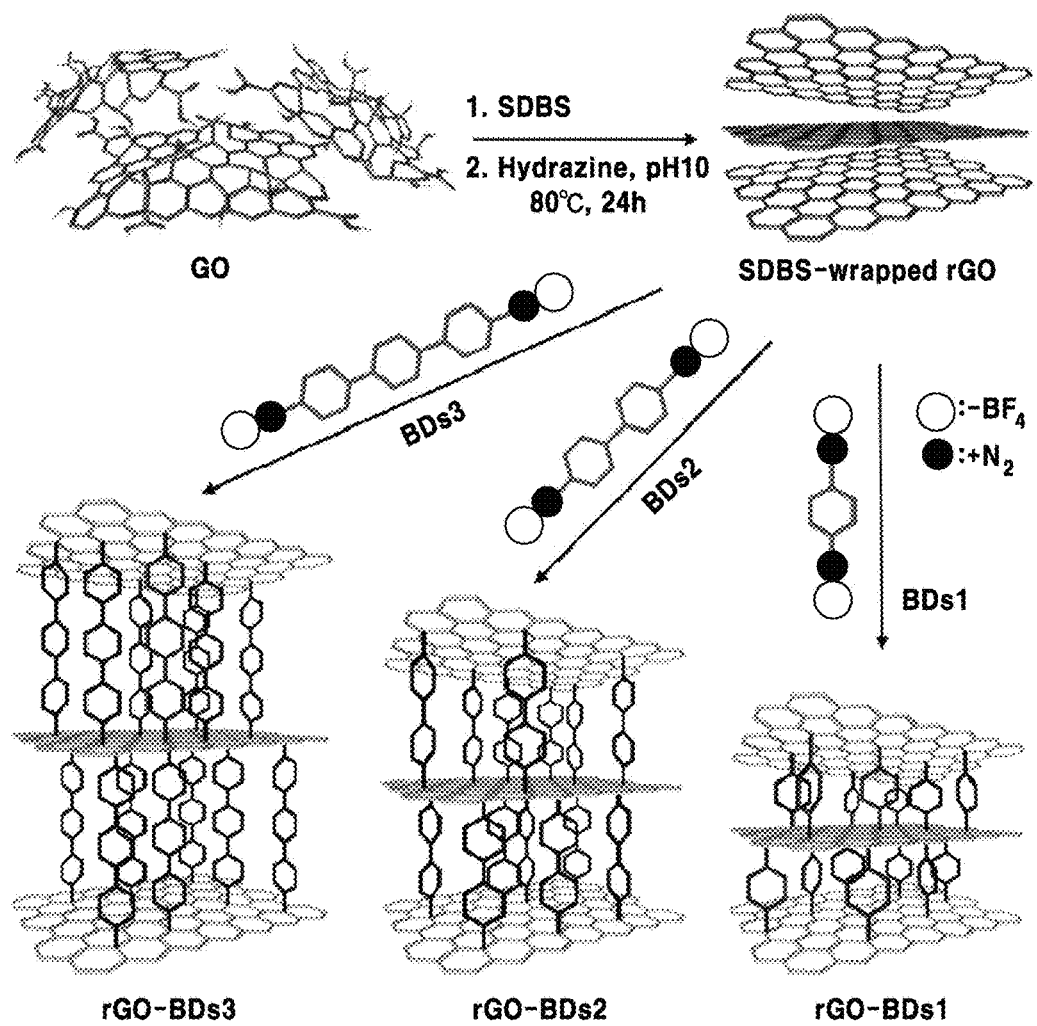
FIG. 2 is a schematic diagram illustrating an example of a method of preparing rGO and various examples of methods of producing interlayer distance controlled rGOs by reactions using various bis-diazonium salts (BD).

FIG. 2 is a schematic diagram showing a preparation scheme of chemically reduced graphene oxide (rGO) by means of hydrazine reduction and a preparation method of interlayer distance controlled-rGO by means of various reactions with BD, according to the examples of the present disclosure. In a functionalizing procedure, 20 mL of dispersed rGO was reacted at 60° C. for 1 day with BD1 to BD3 (respectively, 0.33 mmol/mL dispersed rGO), each of which was prepared as described above in Examples 3 to 5. The dispersed rGO was reacted with a parts ($N_2^+$) of the diazonium salts of BD1 to BD3 and then was connected to an aryl group of BD1 to BD3 so as to obtain rGO-BD 1, rGO-BD 2, and rGO-BD 3, respectively. Subsequently, the product was diluted with acetone and filtered through a 0.2 μm PTFE membrane (Whatman™). The filter cake was washed with distilled water and acetone several times and then was re-suspended in N,N-dimethyl formamide (DMF) to remove SDBS excess BD, and thereafter, was filtered through a 0.2 μm PTFE membrane. Then, the filter cake was washed with acetone. The product was dried in a vacuum oven at 80° C. for 1 day.

As illustrated in FIG. 2, the interlayer distance controlled graphene composition includes graphene sheets having their interlayer distance controlled by having pillar materials disposed therebetween. An example of the graphene composition may include a plurality of graphene sheets stacked on each other. For example, between the graphene sheets that are arranged substantially parallel to each other, a pillar group may be disposed substantially parallel to each other and substantially perpendicular to the graphene sheets. The pillar group may include an aromatic structure covalently bonded to two adjacent graphene sheets to control the interlayer distance between the two adjacent graphene sheets.

The aromatic structure may include a six-membered carbon ring covalently bonded to a first graphene sheet at one end of the aromatic structure and covalently bonded to a second graphene sheet or another six-membered carbon ring at a para position of the carbon ring. The aromatic structure includes two or more six-membered carbon rings covalently bonded to each other at a C1 position or C4 position such that the two or more six-membered carbon rings form a pillar structure disposed between the two adjacent graphene sheets. The distance between the graphene interlayers can be controlled by using different types of bi-diazonium salts.

Experimental Example 1: Material Characteristics

The structural characterization was performed using a JEOL JSM-7404F field emission scanning electron microscope (FE-SEM) and a JEOL JEM-2100F transmission electron microscope (TEM), operating at 15 kV.

Figure 3A:
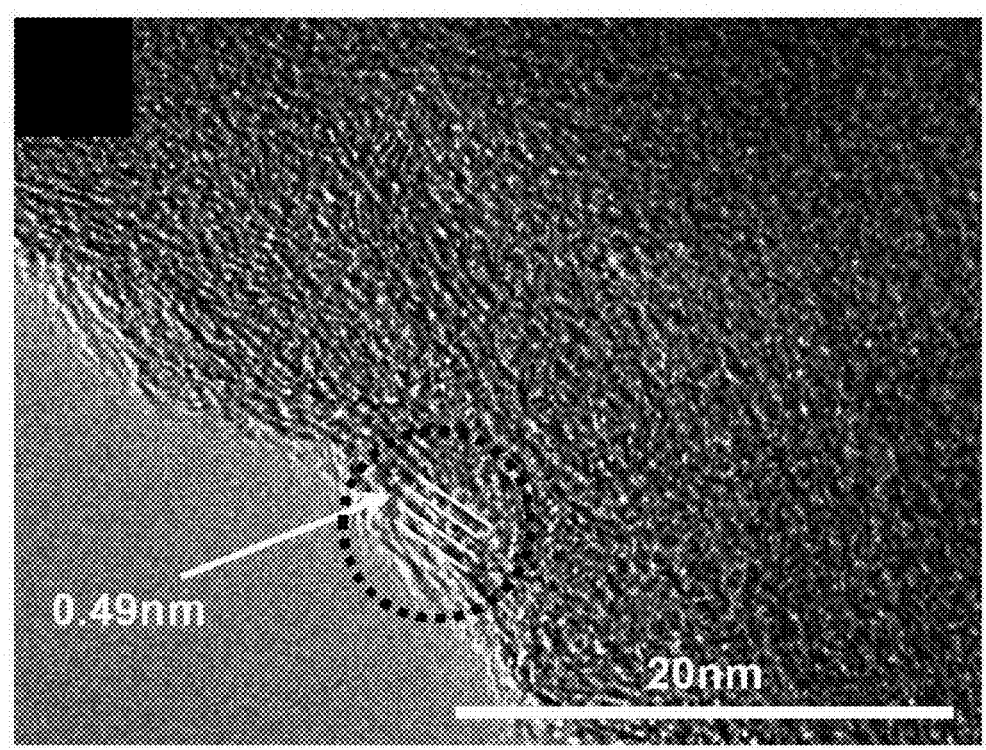
FIG. 3A to FIG. 3C are transmission electron microscope (TEM) images of rGO-BD 1, rGO-BD 2, and rGO-BD 3, respectively, obtained according to an example of a method of producing interlayer distance controlled graphene.
Figure 3B:
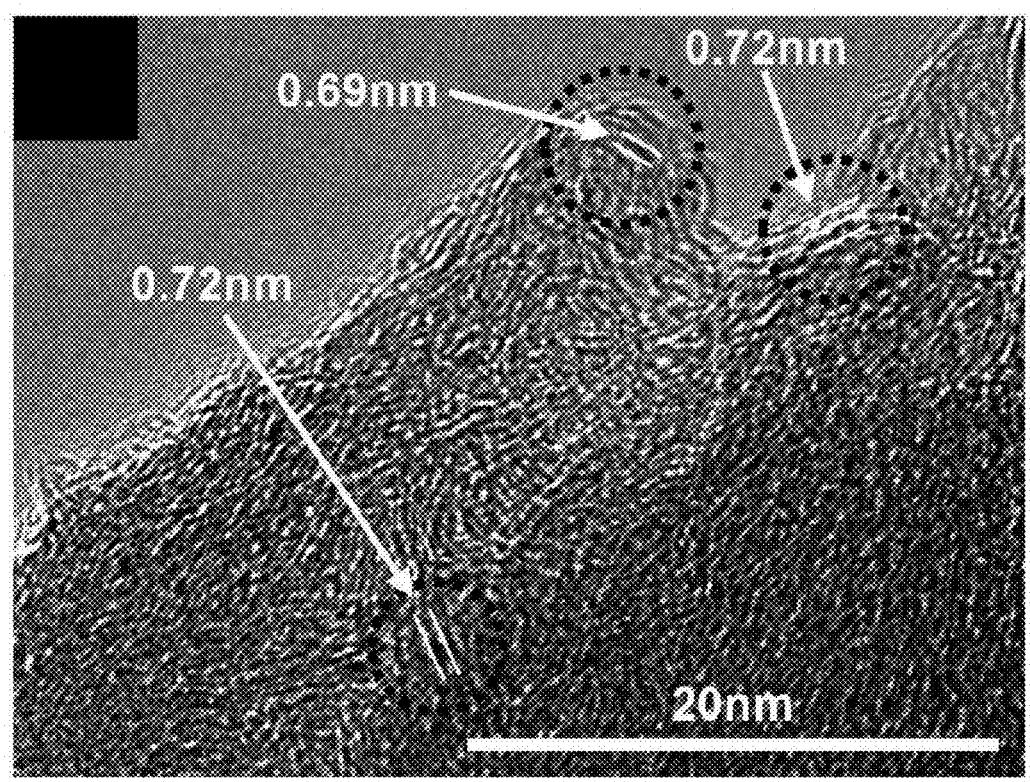
Figure 3C:
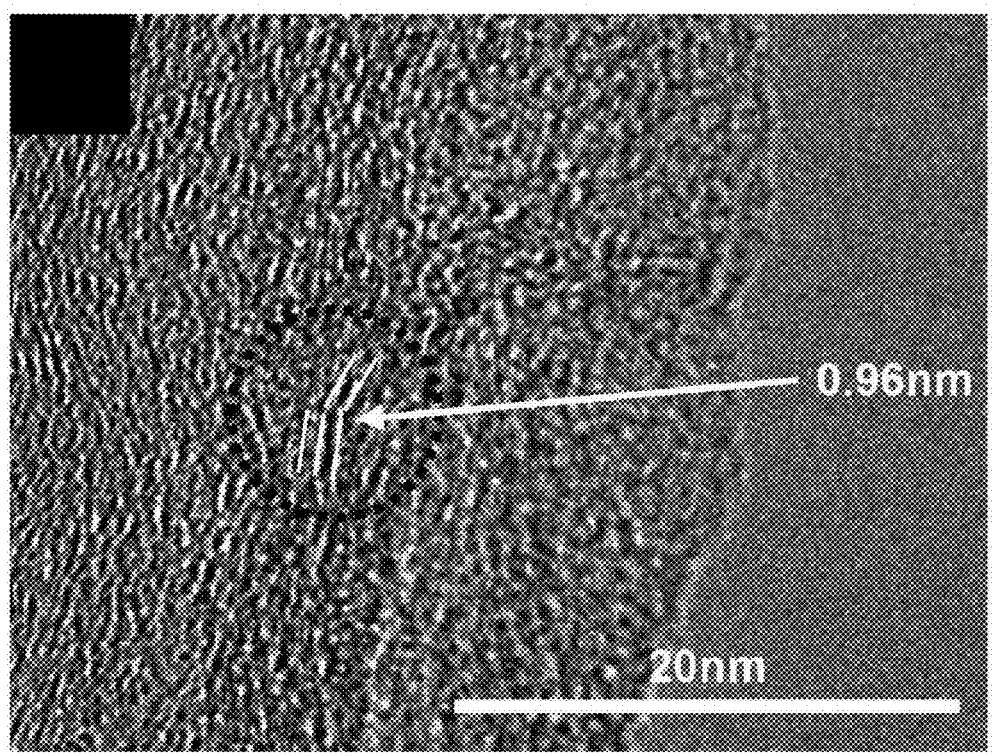

FIG. 3A to FIG. 3C are TEM images of rGO-BD 1, rGO-BD 2, and rGO-BD 3, respectively according to the examples of the present disclosure. In FIG. 3A, the interlayer distance of rGO-BD 1 by an aryl group of BD 1 was 0.49 nm, the interlayer distance of rGO-BD 2 (FIG. 3B) and the interlayer distance of rGO-BD 3 (FIG. 3C) were shown as 0.72 nm and 0.96 nm, respectively. In general, the interlayer distance of the rGO layers was 0.36 nm by hydroiodic acid and acetic acid and 0.38 nm by hydrazine. Thus, it was revealed that the interlayer distances of the rGO-BD series according to the examples of the present disclosure were larger, in comparison with 0.34 nm, which is a theoretical interlayer distance of graphene. Even though it was not recognized that all areas had a consistent high distance value, they maintained a larger distance than common thickness (0.36 nm) of chemically reduced graphene oxide layer because of an aryl group pillar from BD 1, BD 2, and BD 3.

Figure 4A:
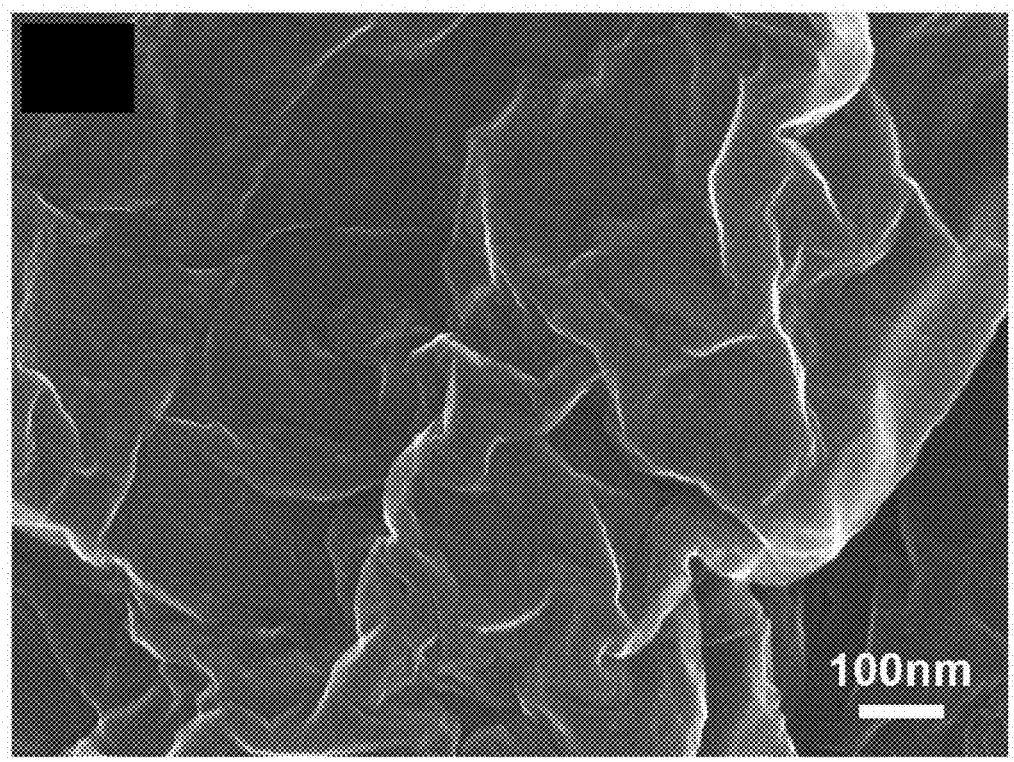
FIG. 4A to FIG. 4D are scanning electron microscope (SEM) images at high-magnification of rGO, rGO-BD 1, rGO-BD 2, and rGO-BD 3, respectively, according to an example of a method of producing interlayer distance controlled graphene.
Figure 4B:
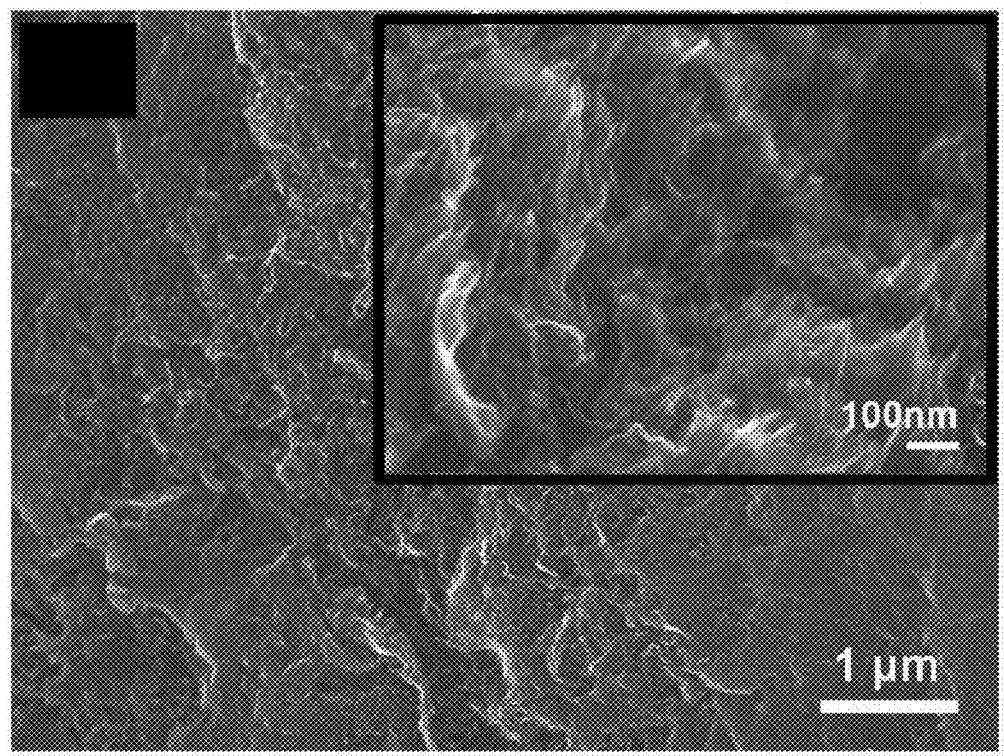
Figure 4C:
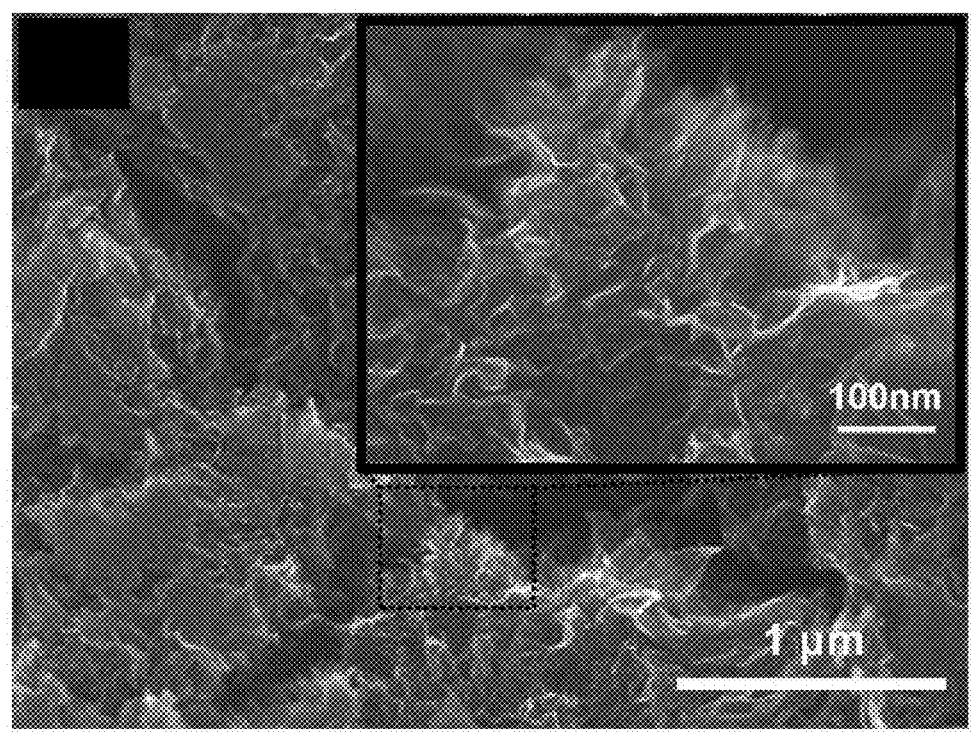
Figure 4D:
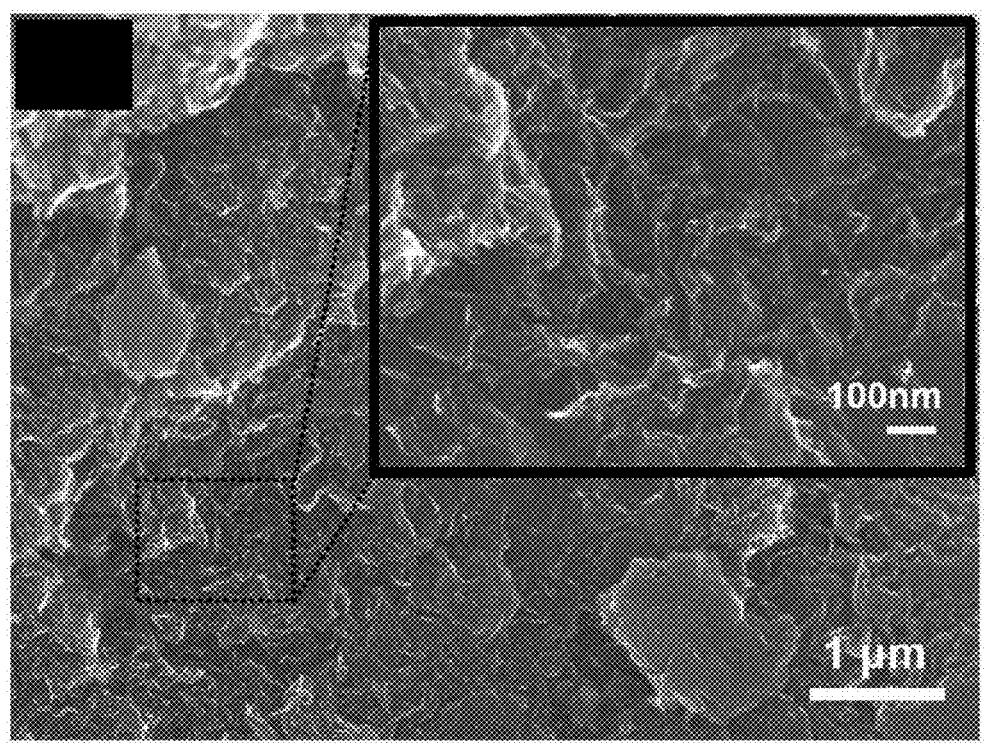
Figure 5A:
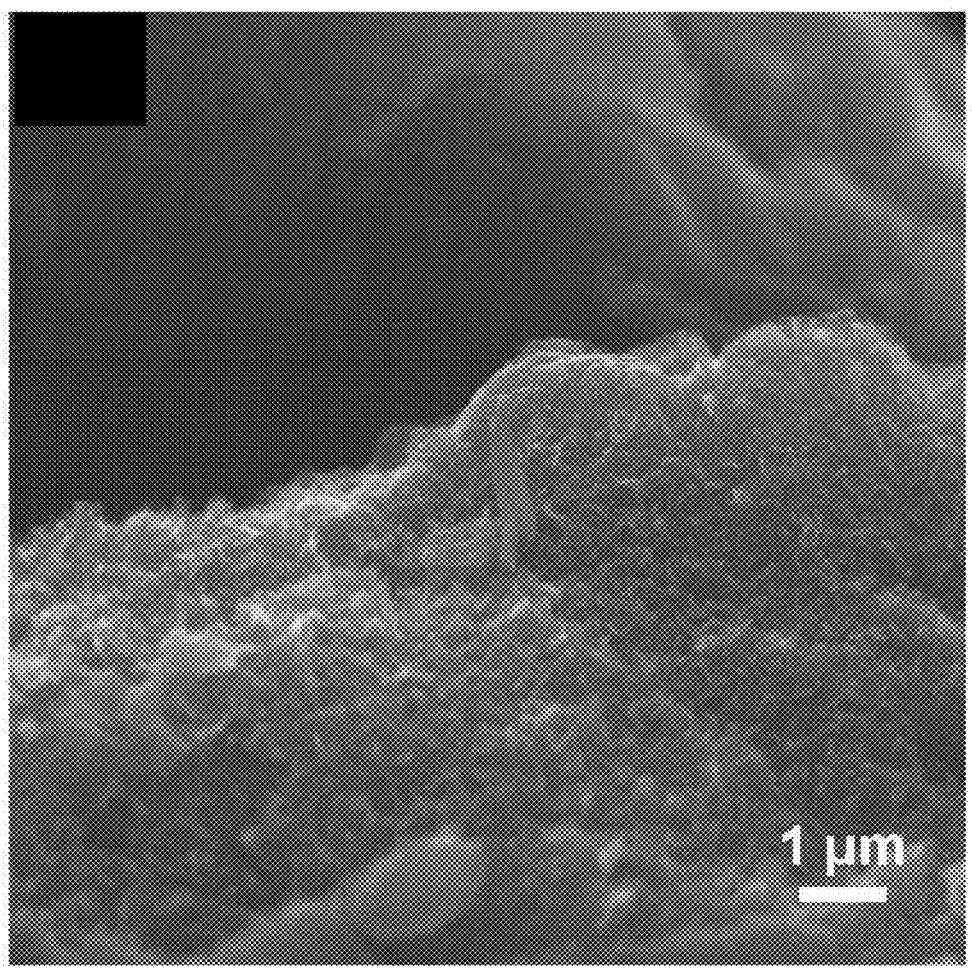
FIG. 5A to FIG. 5C are scanning electron microscope (SEM) images at low-magnification of rGO-BD 1, rGO-BD 2, and rGO-BD 3, respectively, according to an example of a method of producing interlayer distance controlled graphene.
Figure 5B:
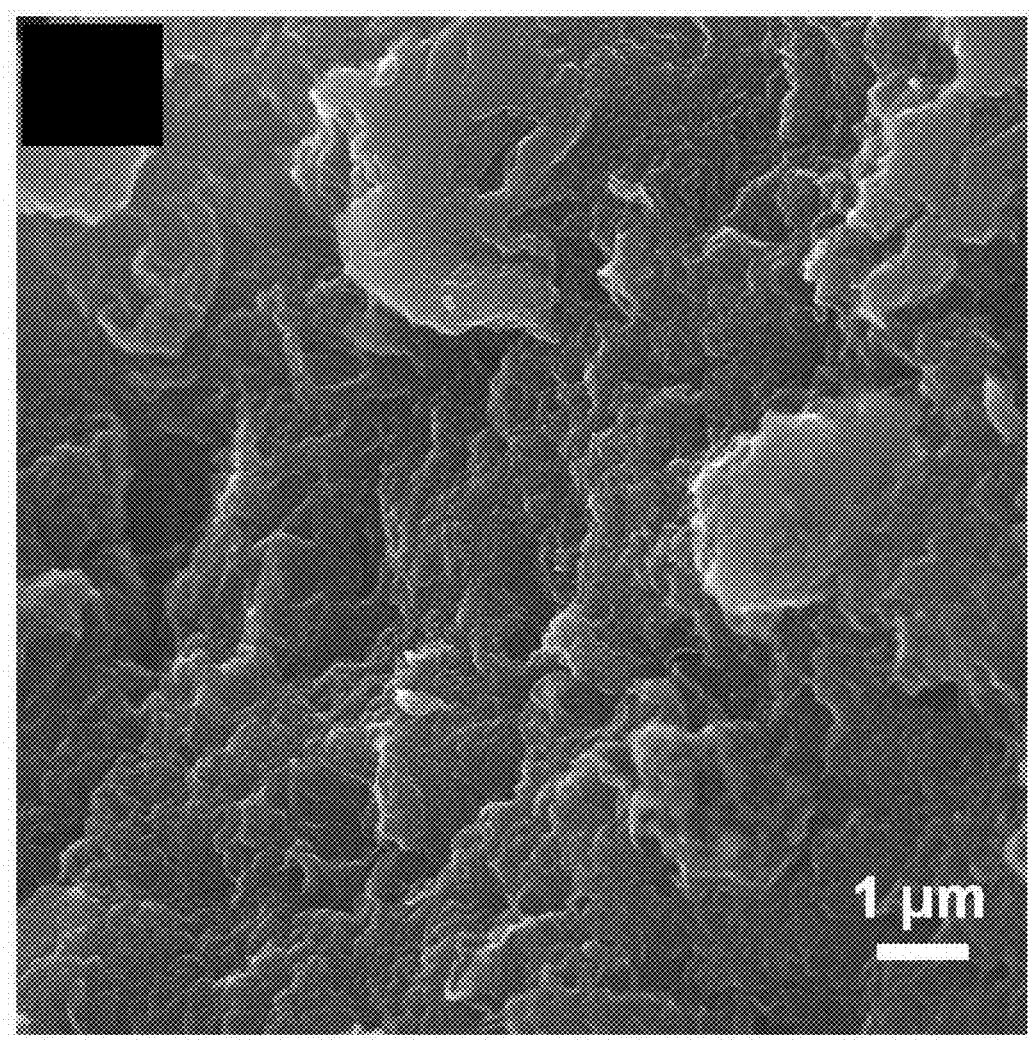
Figure 5C:
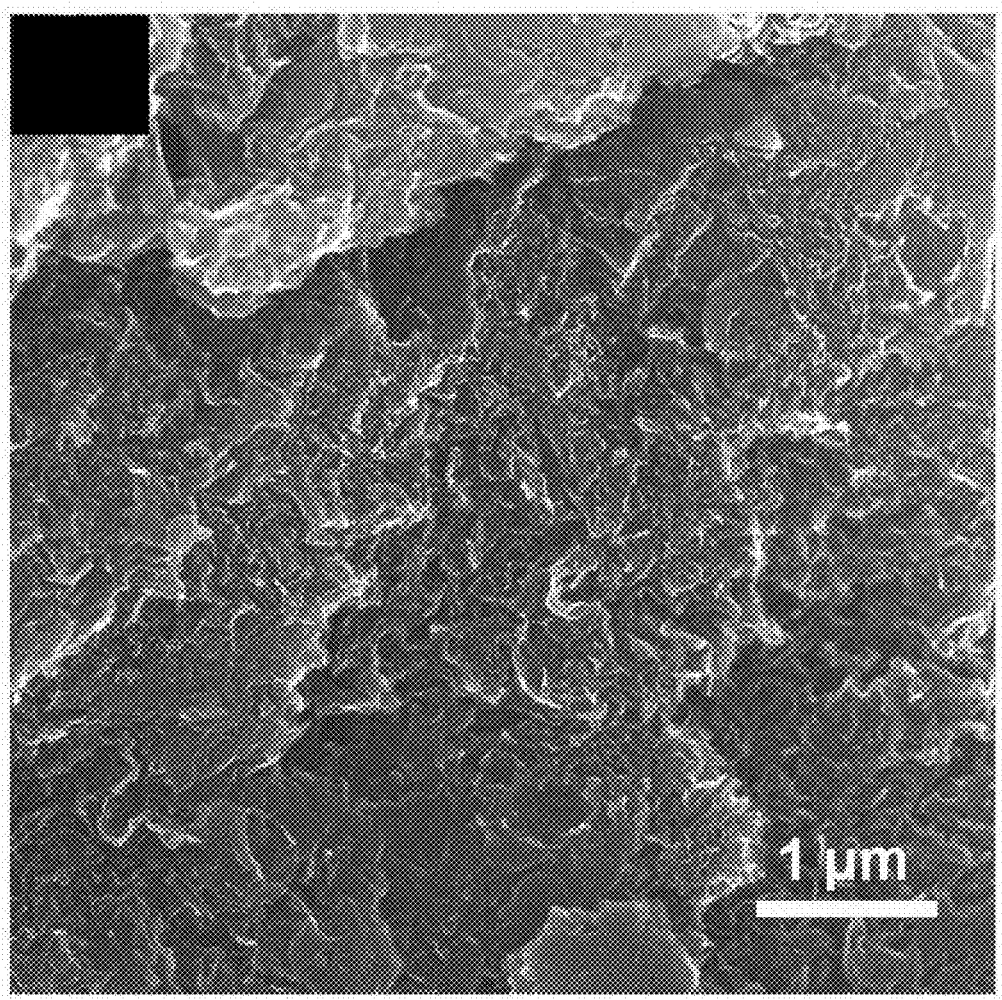

FIG. 4A to FIG. 4D are SEM images of rGO, rGO-BD 1, rGO-BD 2, and rGO-BD 3, respectively, at a high resolution magnification of up to 100,000 times, obtained according to the examples of methods of producing interlayer distance controlled graphene described above. FIG. 4A shows an image of scanning electron microscope (SEM) at high magnification of the rGO surface that is not reacted with BD. The rGO sheets were readily stacked and aggregated due to π-π stacking, electrostatic interaction between the graphene layers. As shown in FIG. 4A, surface roughness such as wrinkles was found from the stacked surface. Different from the wrinkled surface of BD-unreacted rGO, FIG. 4b, FIG. 4C, and FIG. 4D showed surface roughness in disorderly-stacked form of each of rGO-BD 1, rGO-BD 2, and rGO-BD 3. It was considered that the reason was that the rGO-BD series had the larger interlayer distance in comparison to the rGO, in TEM images (FIG. 3A to FIG. 3C) which indicated being protected by self-restacking. The surface roughness of rGO-BD exhibited a different pattern, as in the increased number of an aryl group of from BD 1 to BD 3. As shown in FIG. 5A to FIG. 5C, the surface roughness between the rGO-BD series was not accurately distinguishable at a low resolution magnified by 10,000 times. At a high magnification as in FIG. 4B, rGO-BD 1 showed the most compacted roughness since it was connected by BD 1 which was the shortest aryl-linked compound among the BD series. In contrast, as in FIG. 4D, rGO-BD 3 exhibited a less compacted roughness because of a long aryl group of BD 3. In FIG. 4C, rGO-BD 2 showing a flower-like fine roughness at a high magnification exhibited excellent supercapacitor property.

X-ray diffraction (XRD) measurement was carried out on a Rigaku Ultima IV X-ray diffractometer having Cu Kα radiation at a scan rate of 4 degrees/min.

Figure 6A:
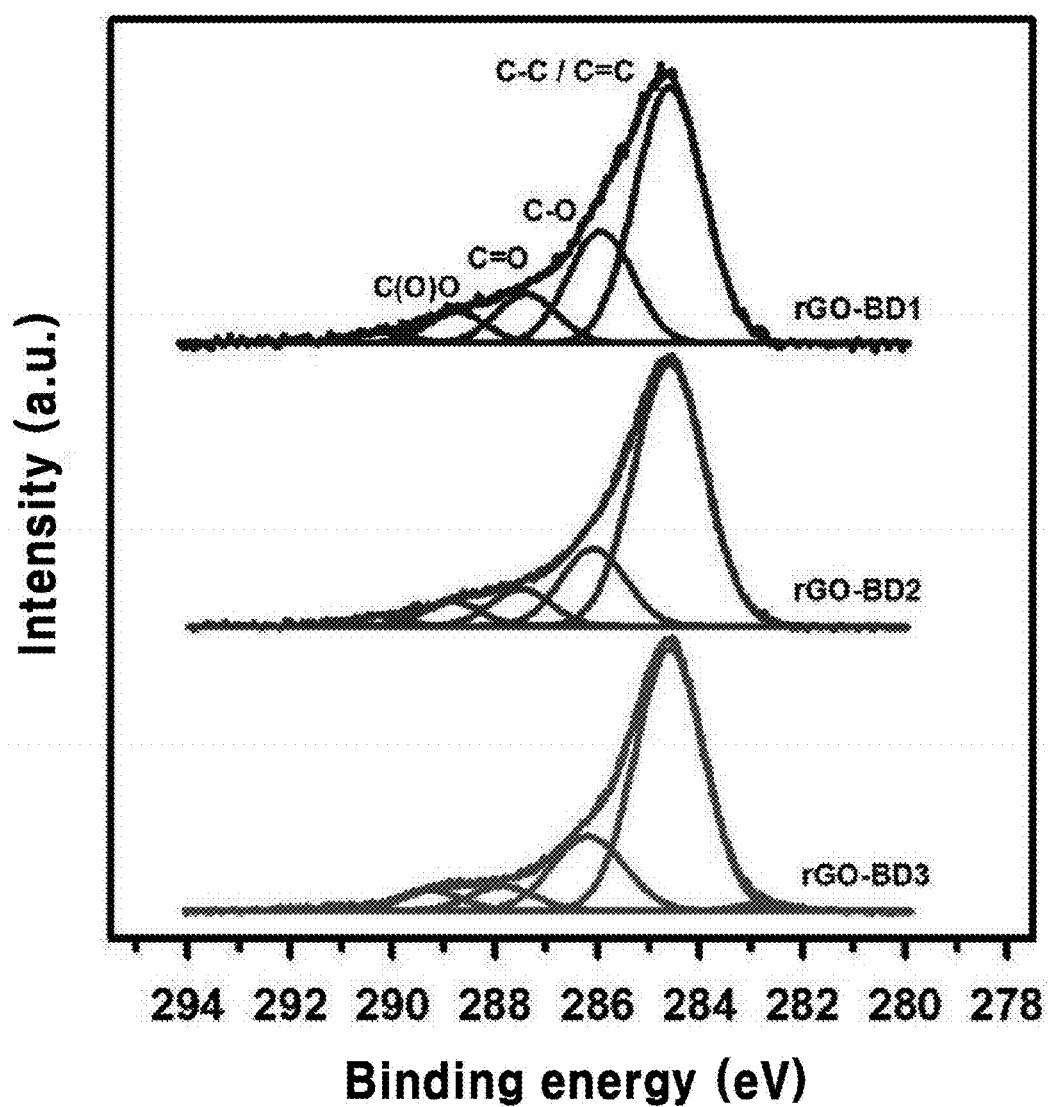
FIG. 6A illustrates XPS C1s peak comparison of rGO-BD 1, rGO-BD 2, and rGO-BD 3, according to an example of a method of producing interlayer distance controlled graphene.

X-ray photoelectron spectroscopy (XPS) was performed to determine the rGO-BD series. The X-ray photoelectron spectroscopy measurement was carried out on Thermo VG Microtech ESCA 2000 with a monochromatic Al-Kα X-ray source at 100 W. FIG. 6A shows XPS C1s peaks comparison of rGO-BD 1, rGO-BD 2, and rGO-BD 3 according to the examples of the present disclosure. The $sp^2$ carbon peak (C—C/C=C) was indicated at 284.5 eV. This peak intensity comes from rGO and an aryl group of BD. The $sp^3$ hydroxyl carbon peak (C—O), carbonyl peak (C=O), and carboxyl peak (C(O)O) of each of the rGO-BD series were shown as 286.1 eV, 287 eV, and 288 eV, respectively. Even though a same surfactant-wrapped rGO solution was utilized, XPS data showed different ratio of $sp^2$ carbon to $sp^3$ carbon by using various BD. The long aryl groups of employed BD more increasing the $sp^2$ carbon peak intensity of rGO-BD. Since rGO-BD 3 used long, three aryl groups as a pillar, as compared with rGO-BD 1 and rGO-BD 2, it had the highest $sp^2$ carbon peak intensity among rGO-BD.

Figure 6B:
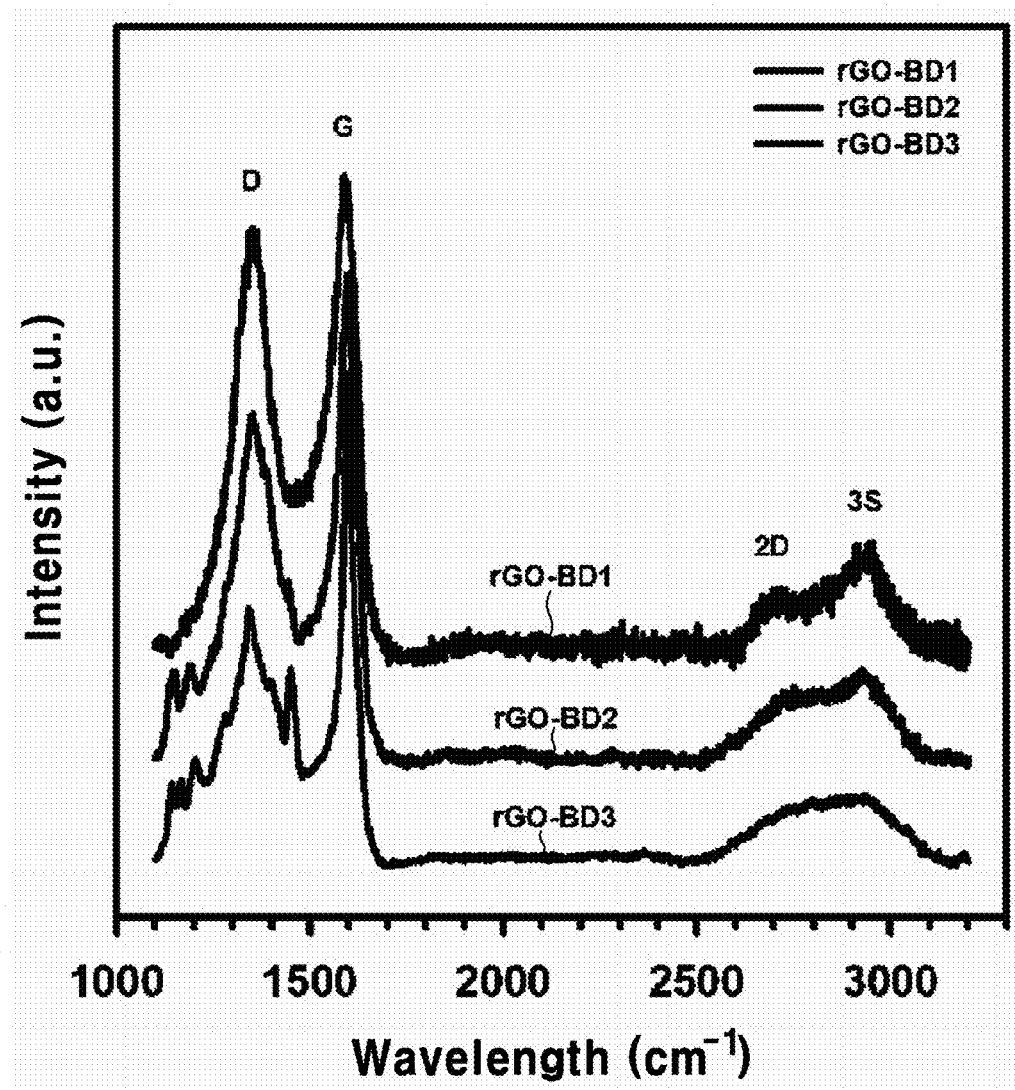
FIG. 6B illustrates Raman spectra comparison of rGO-BD 1, rGO-BD 2, and rGO-BD 3, according to an example of a method of producing interlayer distance controlled graphene.
Figure 7:
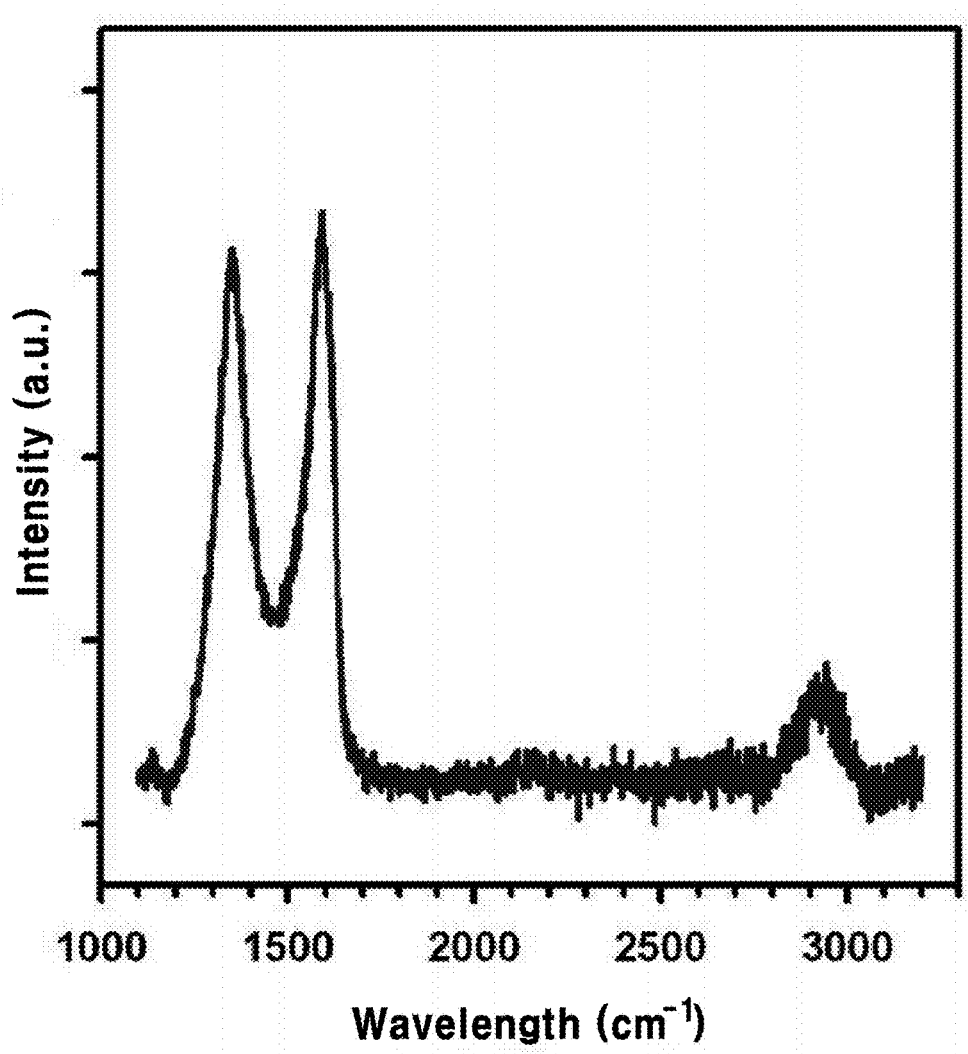
FIG. 7 is a Raman spectra of the bulk rGO that is untreated by BD, according to an example of a method of producing interlayer distance controlled graphene.
Figure 8A:
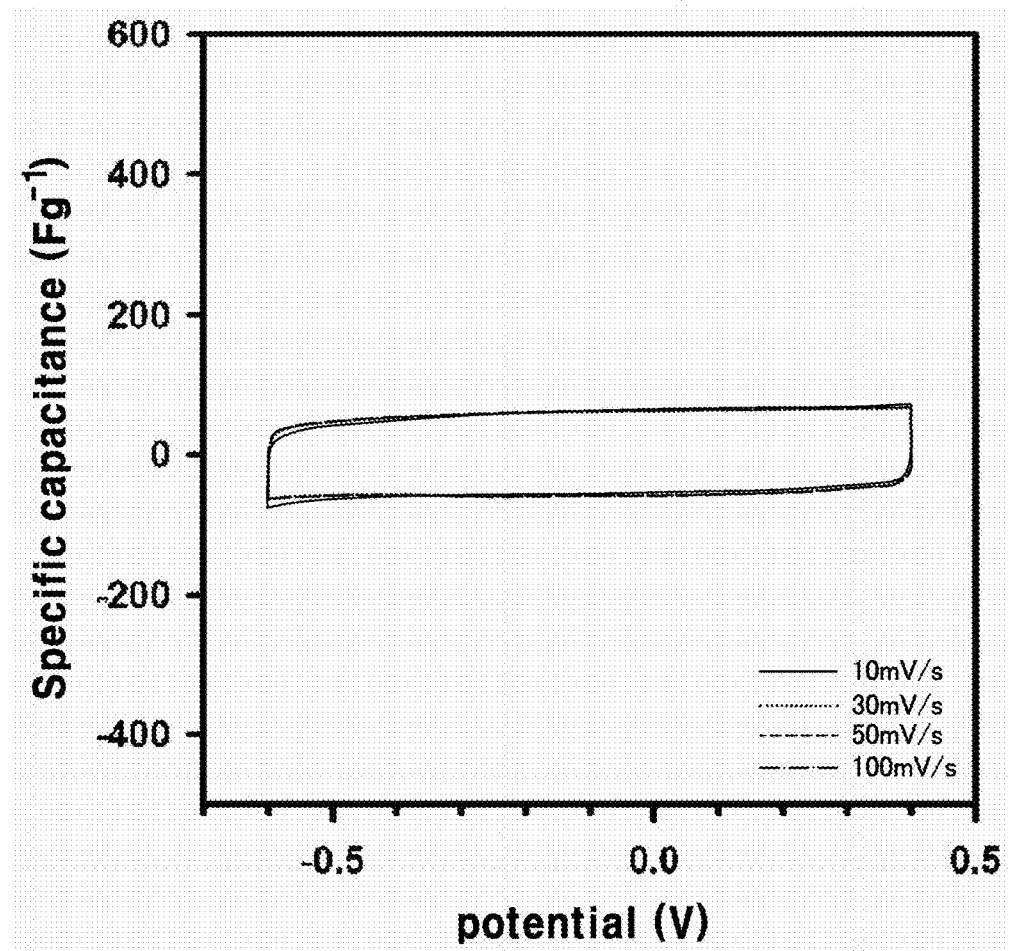
FIG. 8A to FIG. 8D illustrate the electrochemical behavior of cyclic voltammetry curves of rGO, rGO-BD 1, rGO-BD 2, and rGO-BD 3, respectively, in about 6.0 M KOH electrolyte in scan rate ranges from about 10 mV/s to about 100 mV/s, according to an example of a capacitor obtained with interlayer distance controlled graphene.
Figure 8B:
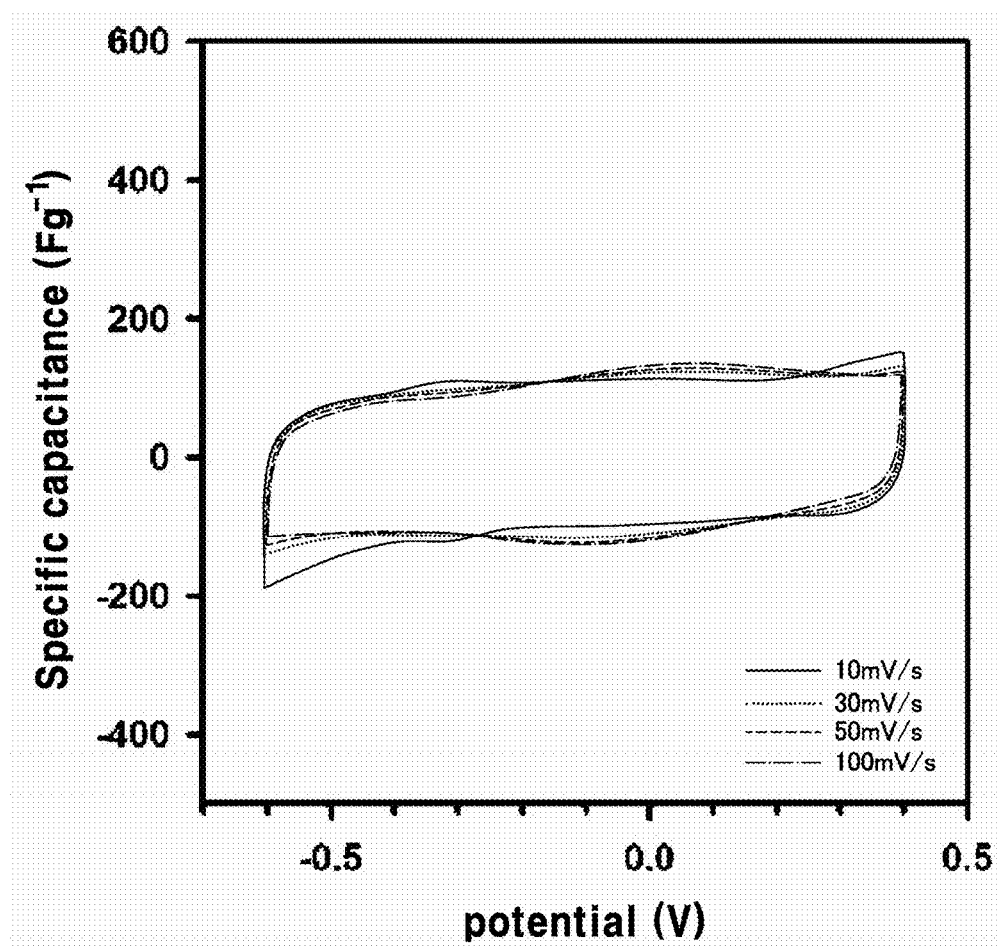
Figure 8C:
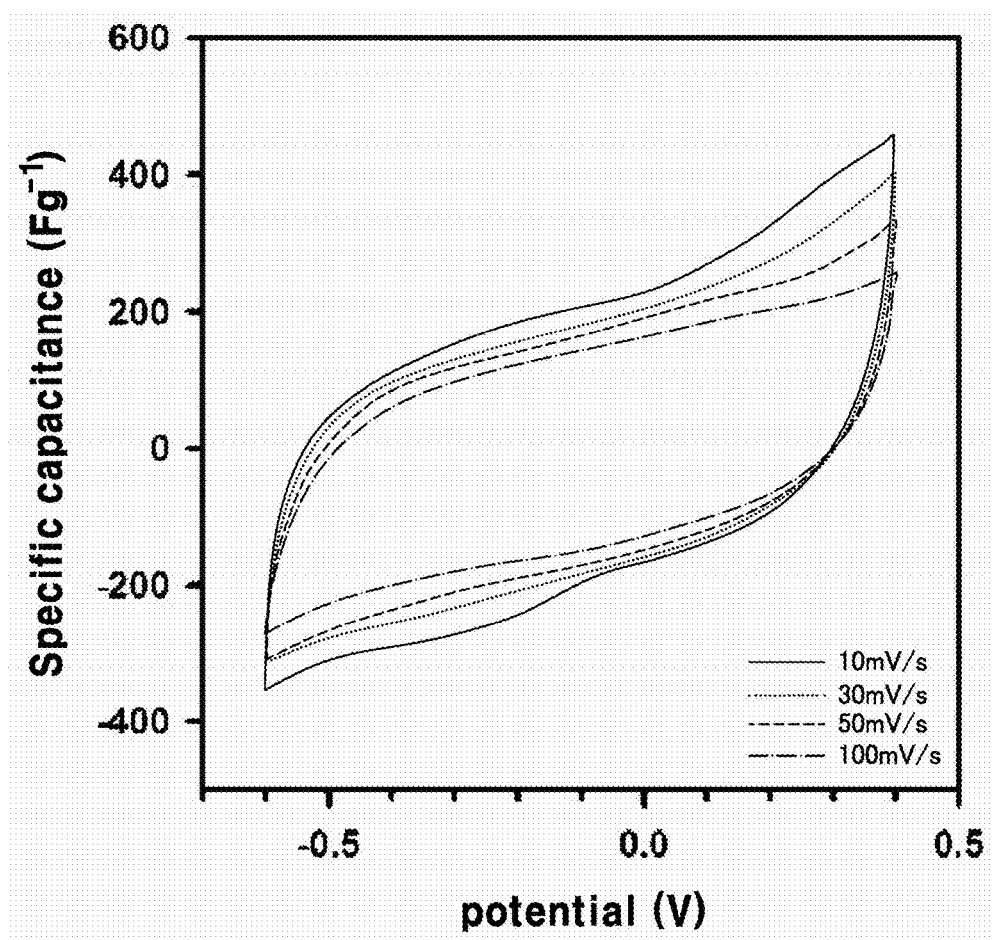
Figure 8D:
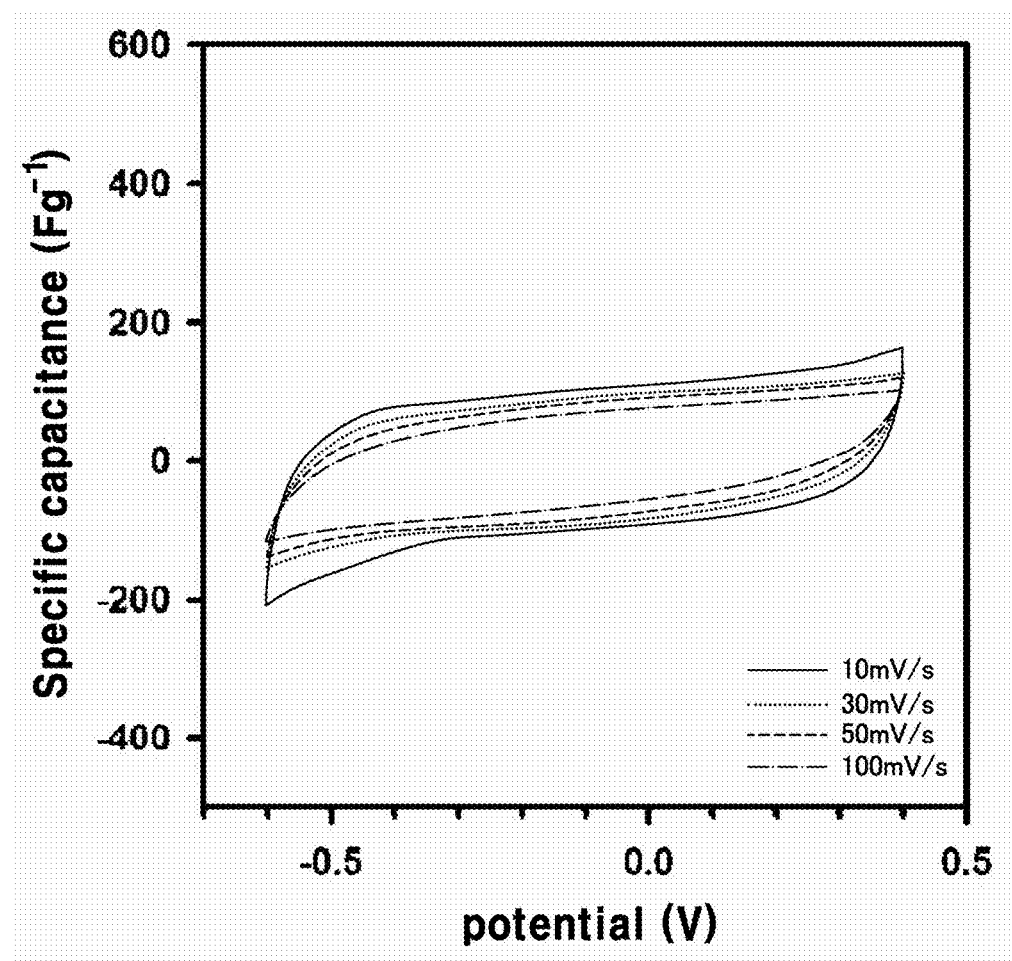
Figure 8E:
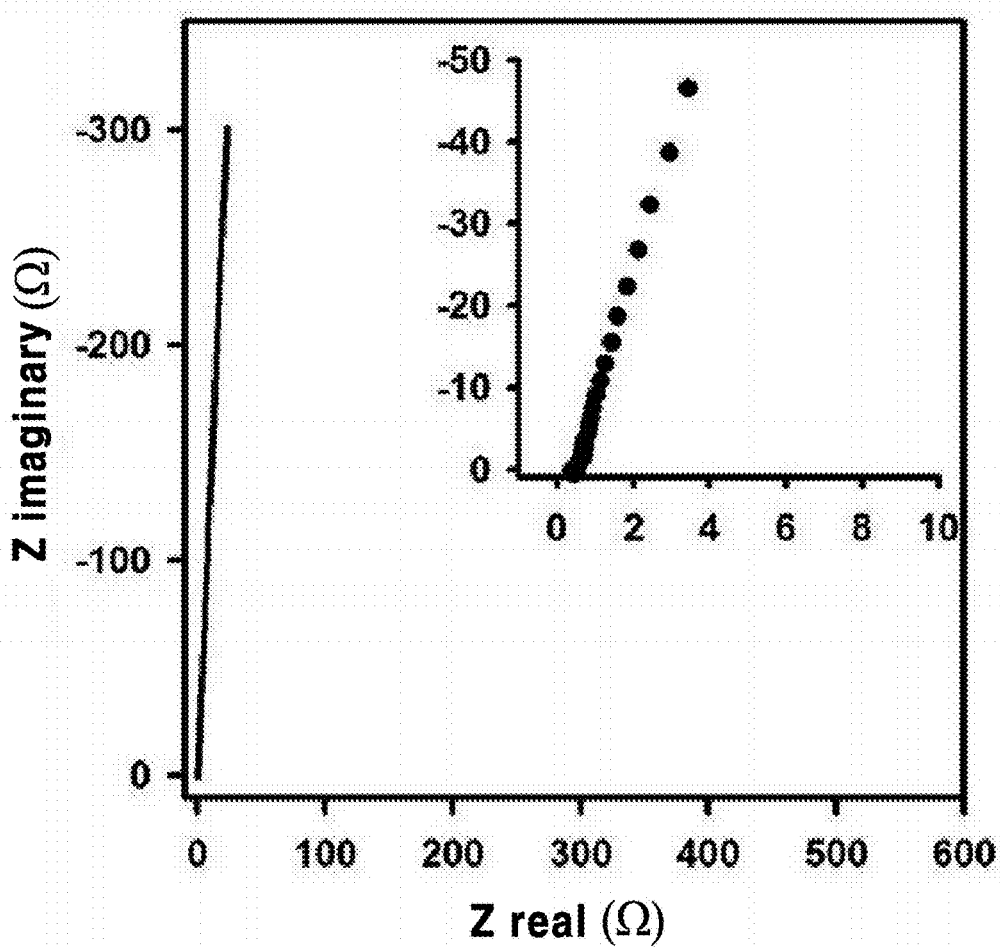
FIG. 8E to FIG. 8H show magnified data at high frequencies region of rGO, rGO-BD 1, rGO-BD 2, and rGO-BD 3, respectively, and Nyquist plot in the frequency range from about 0.01 Hz to about 100 kHz with about 10 mV ac amplitude, according to an example of a capacitor obtained with interlayer distance controlled graphene.
Figure 8F:
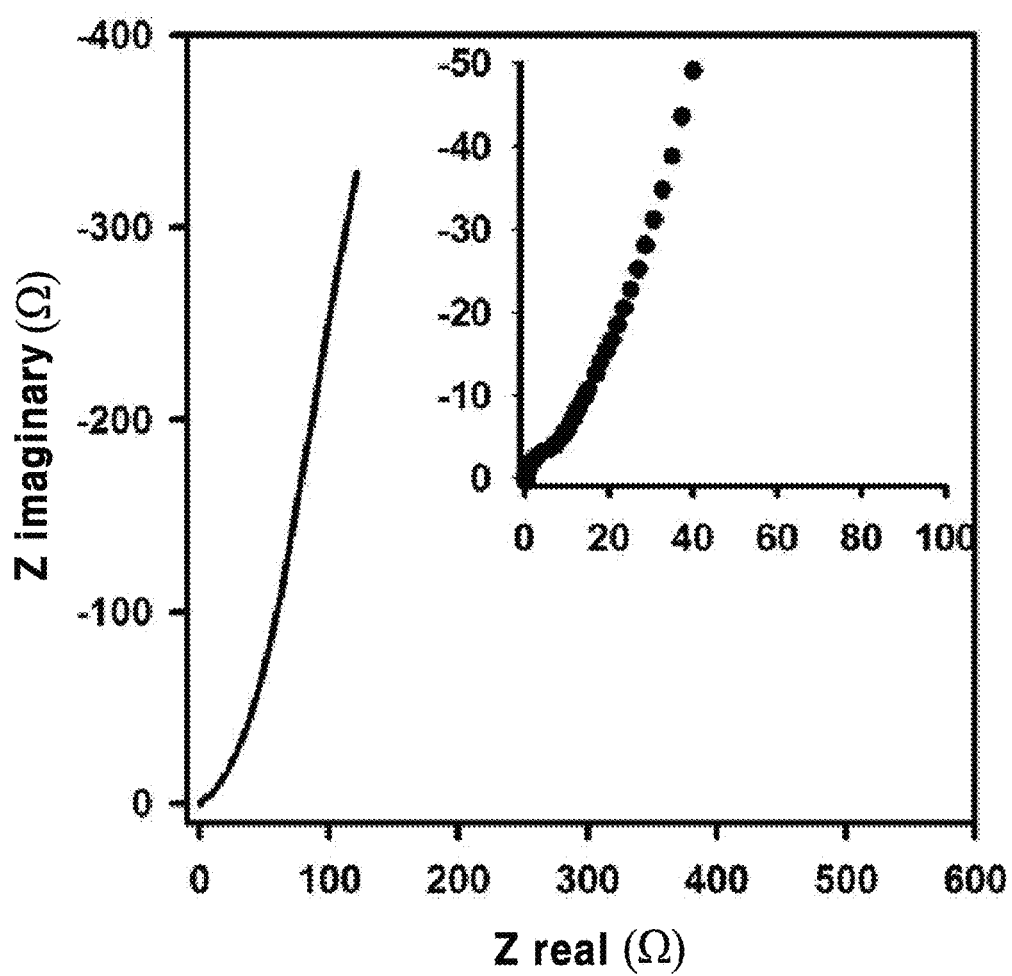
Figure 8G:
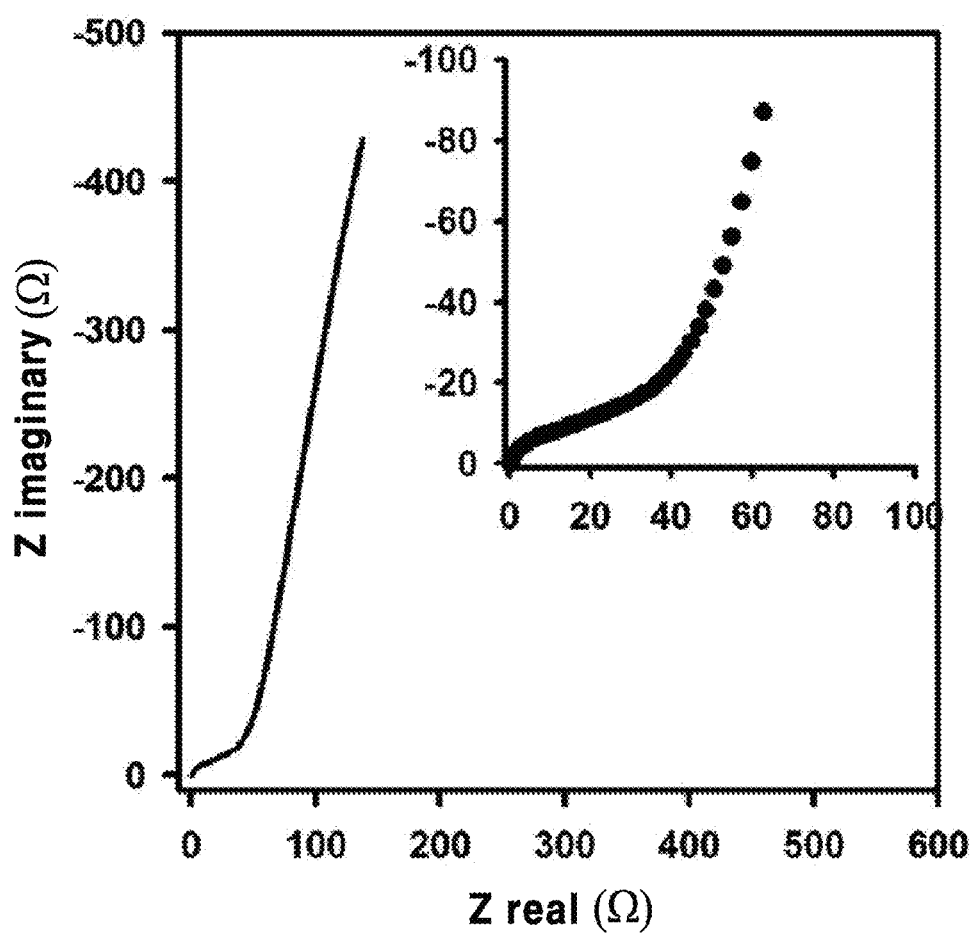
Figure 8H:
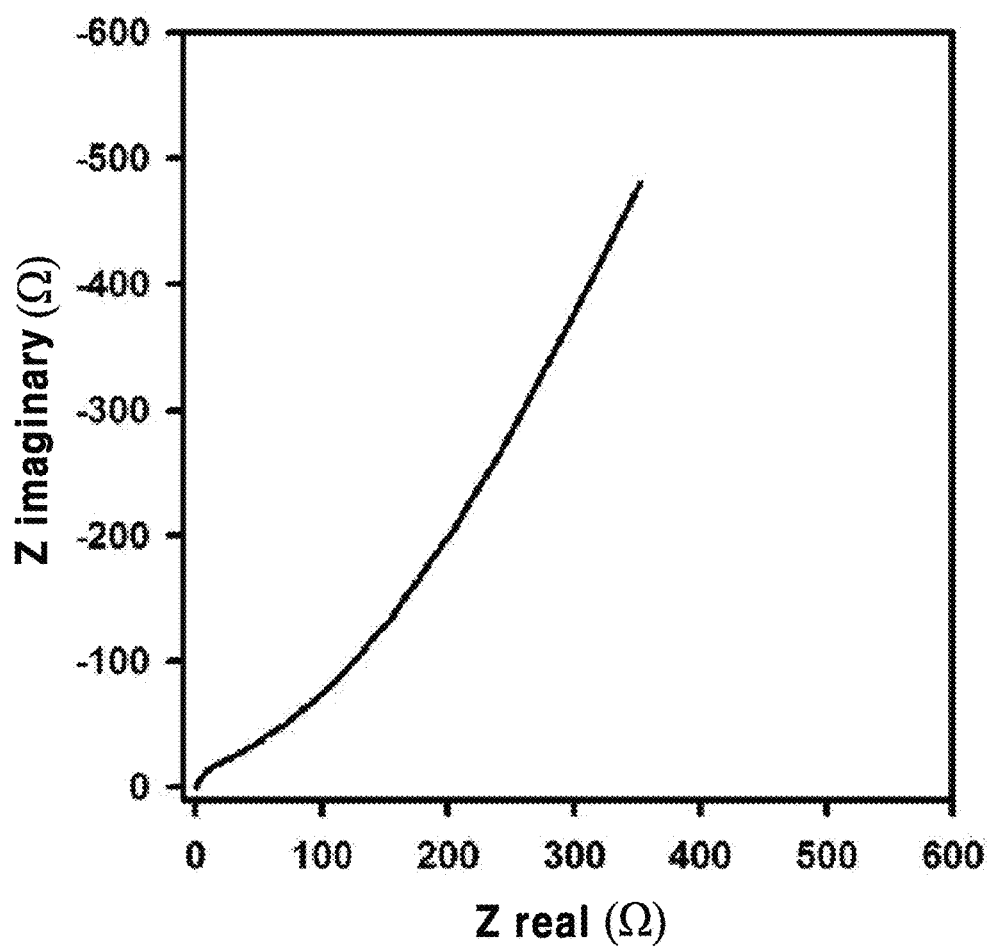

FIG. 6B shows Raman spectra comparison of rGO-BD 1, rGO-BD 2, and rGO-BD 3 according to the examples of the present disclosure. The Raman spectroscopy was measured by means of Renishaw RM 1000-Invia micro-Raman system having excitation energy at 2.41 eV (514 nm). Raman spectroscopy revealed the influence of rGO-BD synthesis conditions resulting from changes in BD parts. As in FIG. 6B, each disorderly induced D band appeared at 1350 cm$^{-1}$, including rGO (FIG. 7), whereas, 2D band (referred to as 'G') appeared at 2700 cm$^{-1}$. Extended 2D band can be explained from the splitting of the electronic band structure of multi-layered graphene. As in the planar graphene of rGO, rGO-BD 1, rGO-BD 2, and rGO-BD 3, G-bands attributed to sp$^a$ C—C bond vibration appeared at 1592.7 cm$^{-1}$, 1594 cm$^{-1}$, 1595.5 cm$^{-1}$, and 1597.3 cm$^{-1}$, respectively. As the BD pillar length was increased in G-band, a slight blueshift of G-band was observed, and the long aryl pillar-typed BD exhibited a relatively strong doping effect, in comparison with a short aryl pillar BD or BD without pillar. It was confirmed through $I_D/I_G$ ratios that rGO-BD 3 had the longest interlayer distance. In physically defected graphite materials, the ratios of integrated intensities of D and G bands ($I_D/I_G$) relied on the crystallite size ($L_a$), while following the relationship given below:

$$I_D/I_G = C(\lambda)/L_a$$

wherein $C(\lambda)$ is 11 nm, and $\lambda$ is 514 nm(ref).

Figure 6C:
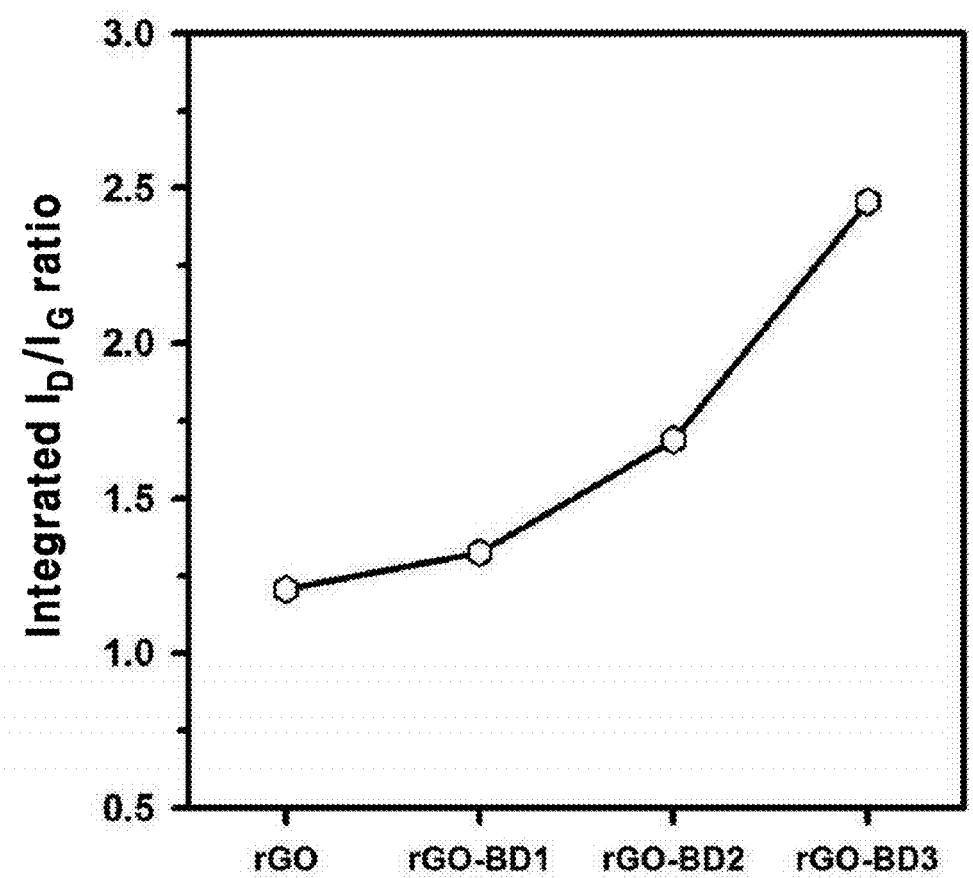
FIG. 6C illustrates a comparison of integrated area ratio $I_D/I_G$ of examples of interlayer distance controlled graphene compositions.

As indicated in FIG. 6C, from rGO to rGO-BD 3, the $I_D/I_G$ ratios increased gradually, which indicated that rGO-BD 3 had the highest $I_D/I_G$ ratios equally meaning the lowest $L_a$. In the reaction, the dispersed rGO sheets were linked to an aryl group from BD, while the interlayer distance increased according to the number of the aryl group. Particularly, rGO-BD 3 exhibited the longest interlayer distance which can influence on the disordered (AB stacked) increase of the graphene crystal structure, which was directly associated with $L_a$-decrease, thereby resulting in the increase of the $I_D/I_G$ ratios.

Experimental Example 2: Electrochemical Characteristics

The rGO and rGO-BD series in accordance with the example of the present disclosure were applied as electrode materials for a supercapacitor.

A supercapacitor cell was prepared by using rGO and rGO-BD series in two symmetrical electrodes and 6.0 M KOH. As antistatic materials, two electrodes and ion porous separator membrane (Whatman, filter paper) were utilized in a test fixture made of two glass panes. Ni form with a pore size of 580 μm was used as a current collector. In order to prepare electrode materials, 5 wt % polyvinylidene fluoride (PVDF) was added to the rGO and rGO-BD series for a binder and subsequently mixed with mortar and ball-mill. The electrode materials were rolled on the current collector and dried in a vacuum oven at 80° C. overnight. The produced cell containing an electrolyte held sufficient moisture.

Figure 9A:
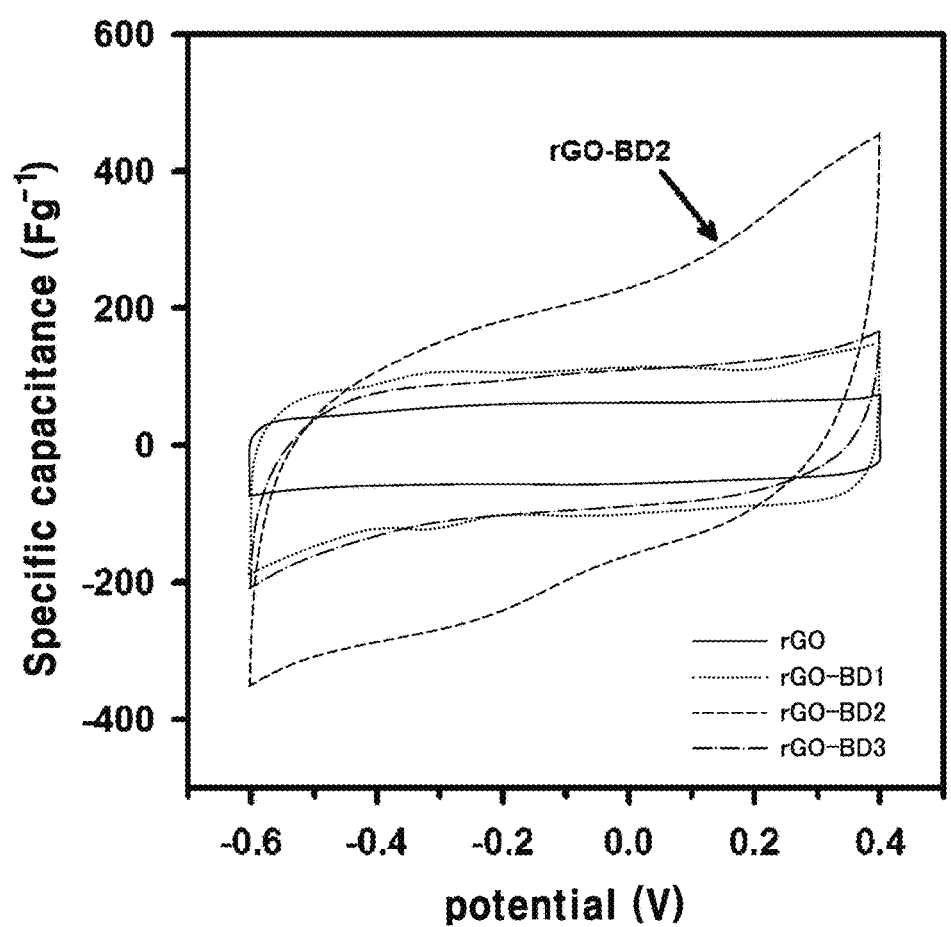
FIG. 9A to FIG. 9D show the electrochemical behavior of rGO, rGO-BD 1, rGO-BD 2, and rGO-BD 3, respectively, in about 6.0 M KOH electrolyte, according to an example of a capacitor obtained with interlayer distance controlled graphene.

The electrochemical behavior of the symmetrical supercapacitor obtained by rGO, rGO-BD 1, rGO-BD 2, and rGO-BD 3 was analyzed by cyclic voltammetry (CV) at a variety of scan rate in 6.0 M KOH electrolyte. FIG. 8A to FIG. 8D show CV curves of rGO, rGO-BD 1, rGO-BD 2, and rGO-BD 3, respectively, in detail, in scan rate ranges from 10 mV/s to 100 mVs. The CV curves maintained a rectangular shape at various scan rates, thereby exhibiting supercapacitor properties for charge/discharge processes such as rapid charge transfer and low equivalent series resistance of supercapacitors, in bulk rGO and rGO-BD series. FIG. 9A is a graph showing cyclic voltammetry curves at a scan rate of 10 mV/s according to the examples of the present disclosure, while presenting overlaid curves to compare with the CV curves of rGO and rGO-BD series at a scan rate of 10 mV/s, in which the rGO and rGO-BD series exhibited a typical rectangular shape for a supercapacitor. Their respective detailed CV curves at a scan rate of 10 mV/s to 100 mV/s were presented in FIG. 8A to FIG. 8D. In particular, the CV shape of rGO-BD 2 was not completely rectangular as compared with that of rGO. As shown in the CV curves, rGO-BD 2 had the highest specific capacitance value, which showed fast diffusion electrolyte and charge transport between the rGO and rGO-BD series. Herein, the excellent CV performance of the rGO-BD series includes the following. As compared with the rGO sheets, the rGO-BD series had more surface active sites and more accessible edges or inner sites between the graphene sheets. These facilitated the adsorption or desorption of electrolyte ions in the graphene interfaces and showed considerable ion mobility under potential, and, dielectric permittivity was reduced in the pores less than the size of their solvation shell. The highly distorted-solvation shell like ions was squeezed through pores like a balloon distortion squeezed through an opening whose size is smaller than that of the salvation shell, which was helpful to increase the capacitance in narrow graphene sheet. Especially, the gap distance of rGO-BD 2 showing excellent performance corresponded to the electrolyte size. In this regard, KOH (potassium hydroxide) of 6.0 M was used as an electrolyte. In fact, the size of hydroxide ions is 1 Å, and thus there was no need to consider it in supercapacitor mechanism. However, in general, in an aqueous solution the size of hydrated potassium ion is 6 Å, which exactly corresponds to the gap distance of rGO-BD 2, as shown in FIG. 2B (interlayer distance: 0.72 nm).

Measurement was conducted on cyclic voltammetry, Galvanostatic charge/discharge curve (recorded as being between −0.6 V and 0.4 V), and electrochemical impedance spectrum (a frequency range of 0.01 Hz to 100 Hz with 10 mV ac amplification) by using CHI660C electrochemical workstation.

The specific capacitance was calculated from integrated CV area and galvano charge/discharge curves by using the following equation for integrated CV area:

$$C = \int \frac{4I}{vmV} dv$$

wherein C indicates the specific capacitance (F/g), I is the current (A), V is the potential window, v is the scan rate (mV/s), and m is the mass (g) of an electrode material used in electrochemical test.

In each of rGO, rGO-BD 1, and rGO-BD 3, the maximum specific capacitance appeared as 56.6 F/g, 104.1 F/g, and 93.9 F/g, respectively, at the scan rate of 10 mV/s, while the maximum specific capacitance in rGO-BD 2 was 190.9 F/g, showing a high performance as a supercapacitor. As compared with the rGO that was untreated with BD, the rGO-BD series had suitable gap distances for absorb or desorb from electrolyte, among which the gap distance of rGO-BD 2 was optimized therebetween. When a solvated electrolyte was injected between the rGO sheets under potential, the rGO sheets have strong electrostatic interaction leading too narrow gap distance by themselves, like a graphite causing an electrolyte distortion interface.

Figure 9B:
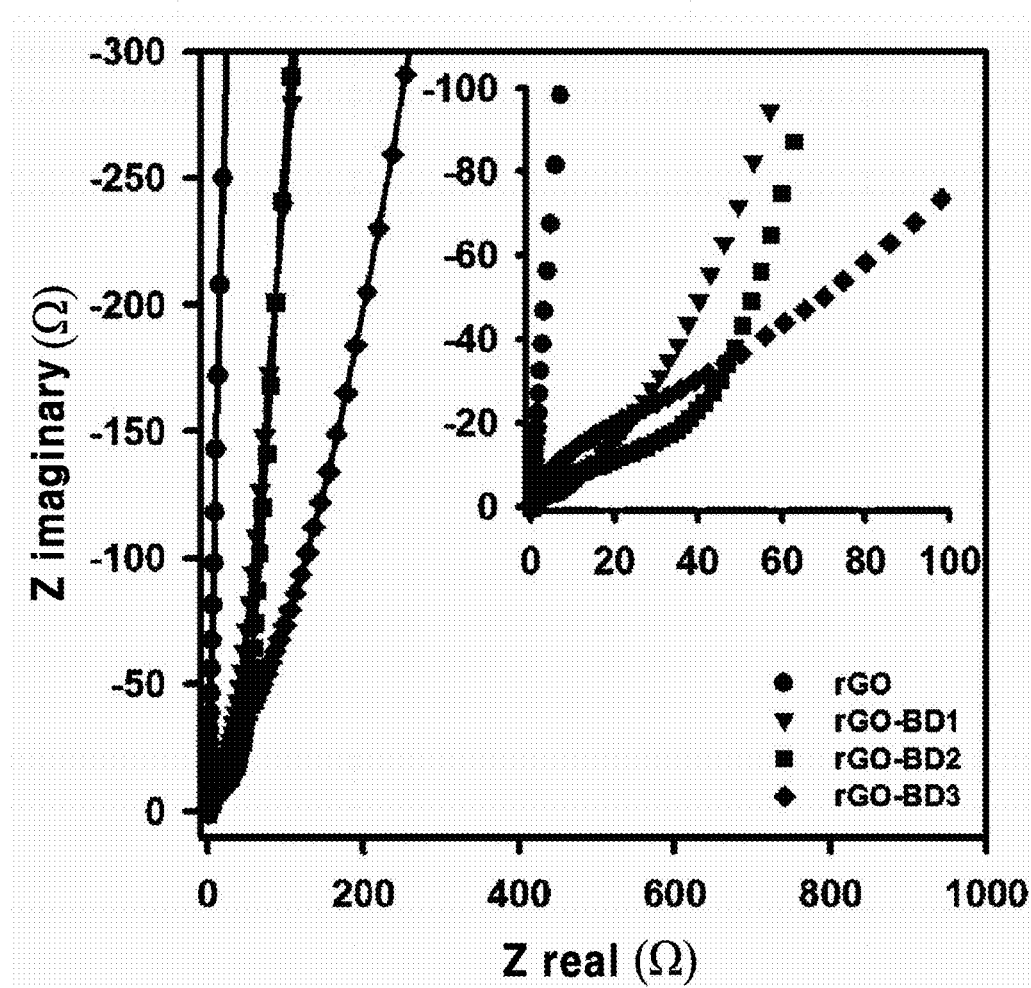
Figure 10:
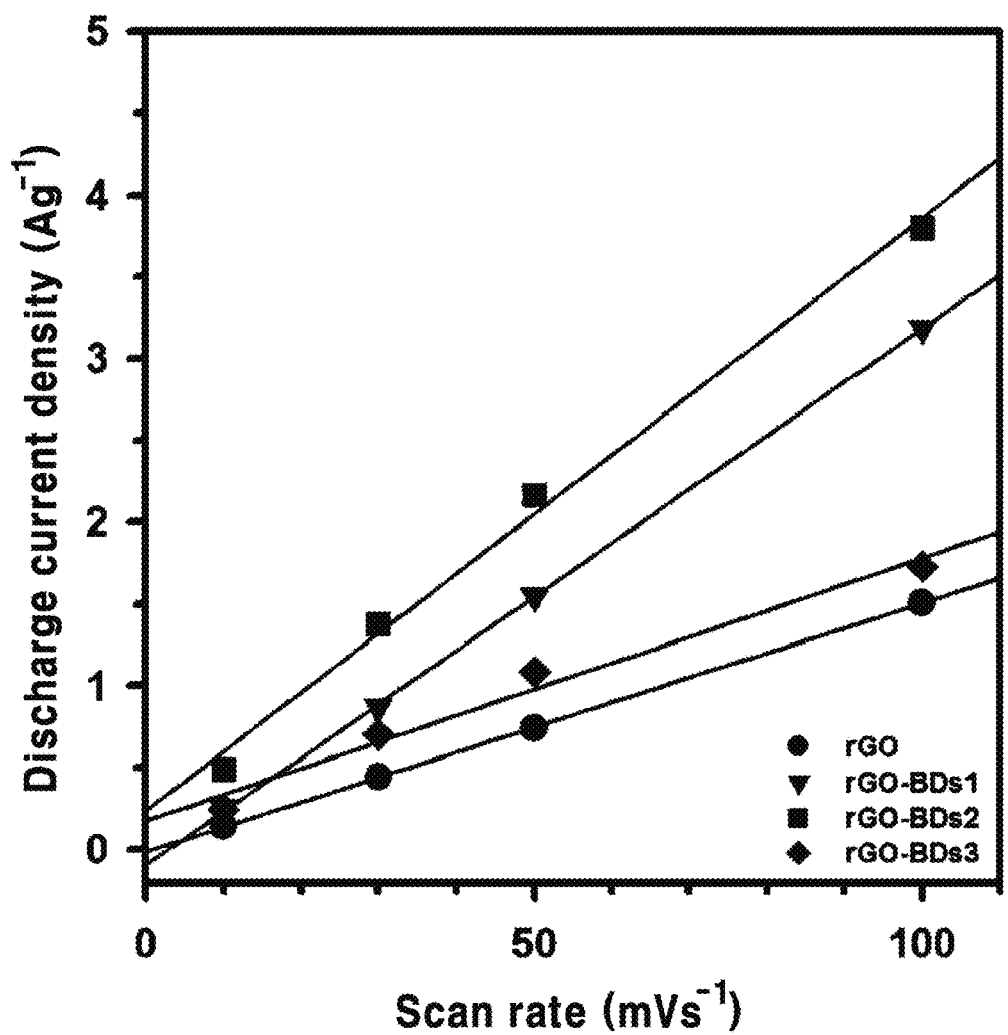
FIG. 10 is a graph showing the dependency of capacitive current on the applied scan rate (extracted from CV curves at about 0.1 V, for the discharge), according to an example of a capacitor obtained with interlayer distance controlled graphene.
Figure 11A:
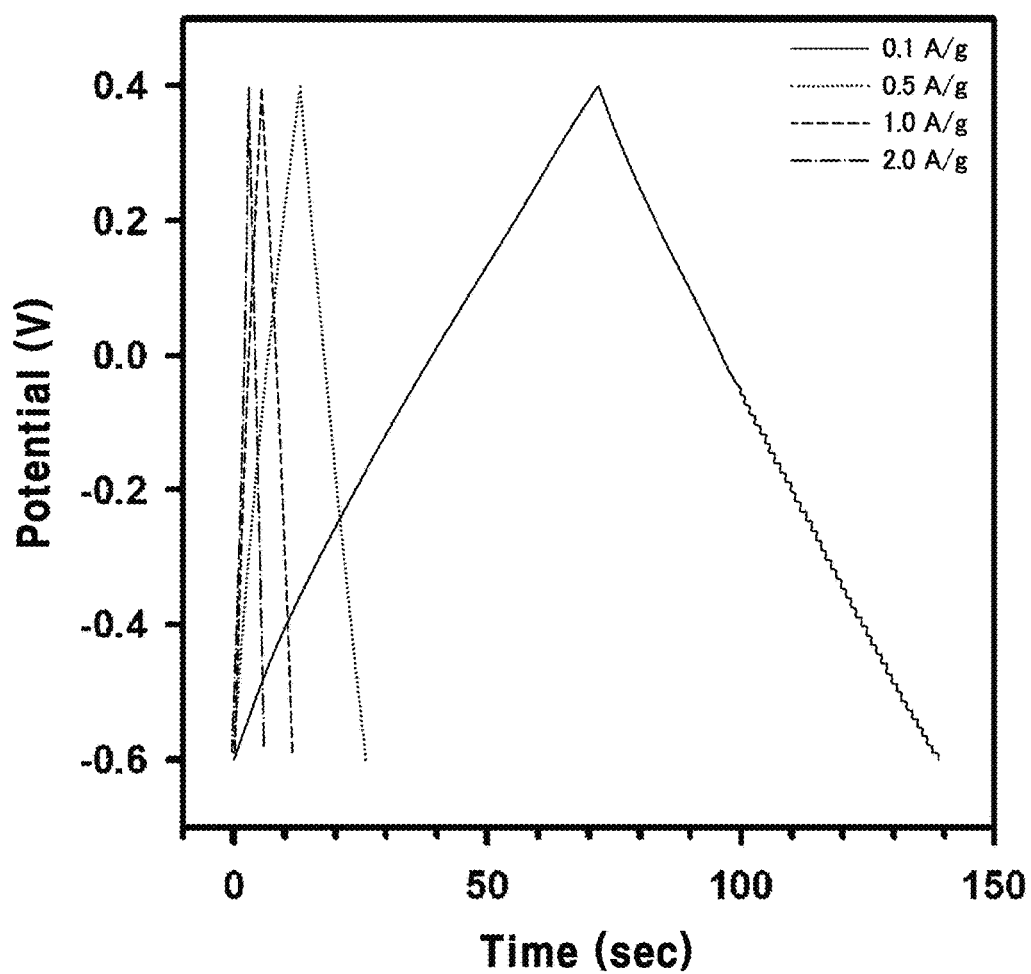
FIG. 11A to FIG. 11D are graphs illustrating the electrochemical behavior of galvano charge-discharge curves of rGO, rGO-BD 1, rGO-BD 2, and rGO-BD 3, respectively, in about 6.0 M KOH electrolyte at the current density at about 0.1 A/g to about 2.0 A/g, according to an example of a capacitor obtained with interlayer distance controlled graphene.
Figure 11B:
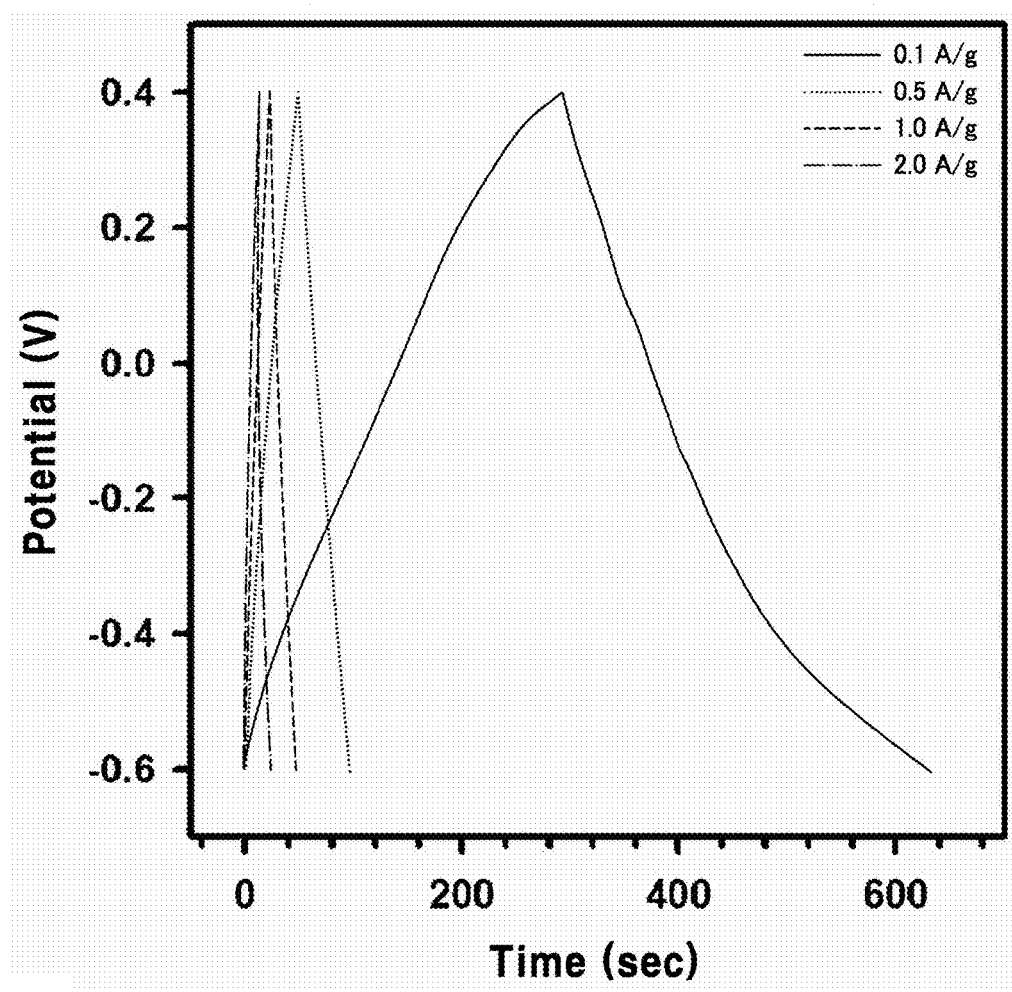
Figure 11C:
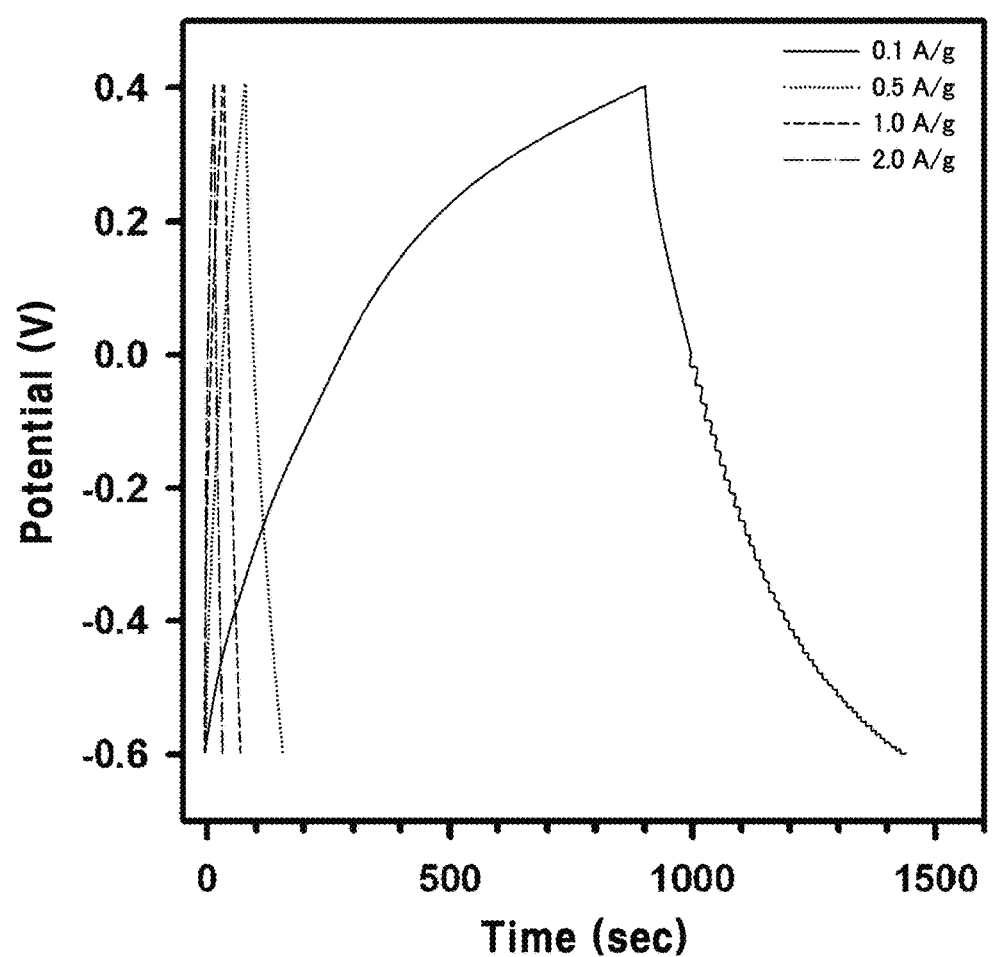
Figure 11D:
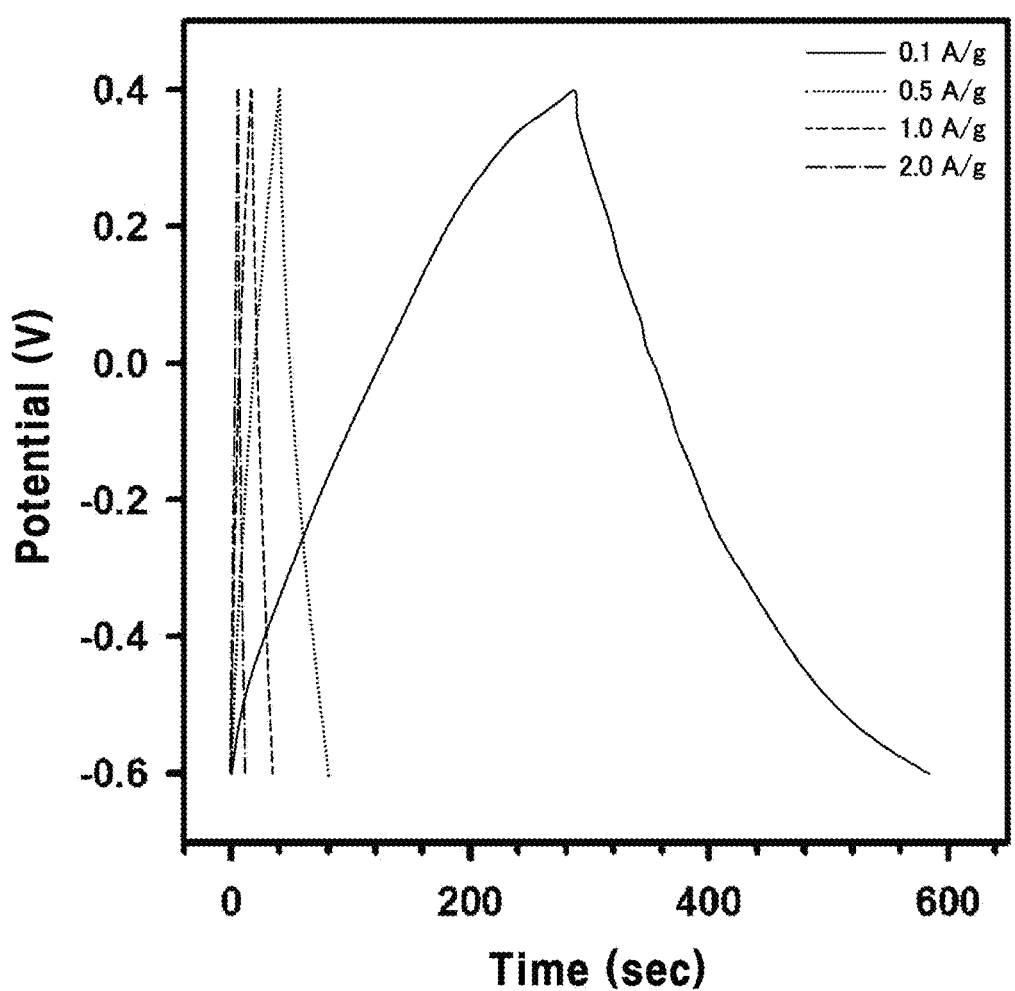

From FIG. 10, it was observable that the charge current densities of rGO and rGO-BD series increased in a nearly linear at −0.1 V, having a scan rate of from 10 mV/s to 100 mV/s, thereby proving the fast diffusion of electrolyte and the rapid charge transport. The electrochemical impedance spectroscopy (EIS) analysis for identifying the behavior of rGO, rGO-BD 1, rGO-BD 2, and rGO-BD 3 for a supercapacitor was studied in the frequency range of 0.01 Hz to 100 kHz with 10 mV ac amplification. FIG. 9B showed the Nyquist plot of rGO, rGO-BD 1, rGO-BD 2, and rGO-BD 3 according to the present disclosure, wherein the inset indicated a high frequency region. The Nyquist plot comprised three different parts, which were, first, a semicircular part at high frequency region which can obtain series resistance ($R_s$) and charge transfer resistance ($R_{CT}$) from the interception at the Z real and the semicircular intercept (ref) in the Nyquist plot, respectively; secondly, a middle frequency region which can obtain Warburg impedance from a inclined portion (45°) the curves for the frequency dependency of the ion diffusion and transport from electrolyte to the electrode surface; and thirdly, a linear part at low frequency region showing an ideal capacitance performance of a supercapacitor cell. As shown in FIG. 9B, the rGO and the rGO-BD series had nearly zero $R_s$ from the intercept at the Z real representing a very low intrinsic internal resistance of electrode material and electrolyte of a supercapacitor cell. While the rGO-BD series showed semicircles, rGO did not show any semicircle in electrolytes. As the number of an aryl group increased from BDs between the rGO sheets, the semicircles size became larger in proportion to the charge transfer processes in Nyquist plot, which implied a high pseudo-capacitance from the rGO-BD series. A comparison of the semicircular parts of the Nyquist plot was shown as in the inset of FIG. 9B. The $R_{CT}$ from the diameters of semicircles at the middle frequency was measured as 0.5Ω, 9Ω, 41Ω, and 70Ω, respectively, for rGO, rGO-BD 1, rGO-BD 2, and rGO-BD 3 (FIG. 8E to FIG. 8H). Even in a case where $R_{CT}$ determining the entire internal resistances for rGO, rGO-BD 1, rGO-BD 2, and rGO-BD 3 was higher than that of rGO, the capacitance value was much greater than that of rGO. The expanded gap distances of the rGO-sheets by BD led to an improvement in the accessibility, absorption and desorption of electrodes, thereby leading to the increase of capacitance value as pseudo-capacitance. Incomplete semicircles were formed at a high-frequency region, implying the existence of a high ion-conductivity on electrode material and electrolyte interface, which corresponded to a high rate of capabilities of the rGO and the rGO-BD series. The vertical line of the Nyquist plot at a low-frequency region each indicated that the supercapacitor cells had superior electrochemical performance, which led to the increase of ion diffusion on electrodes.

Figure 9C:
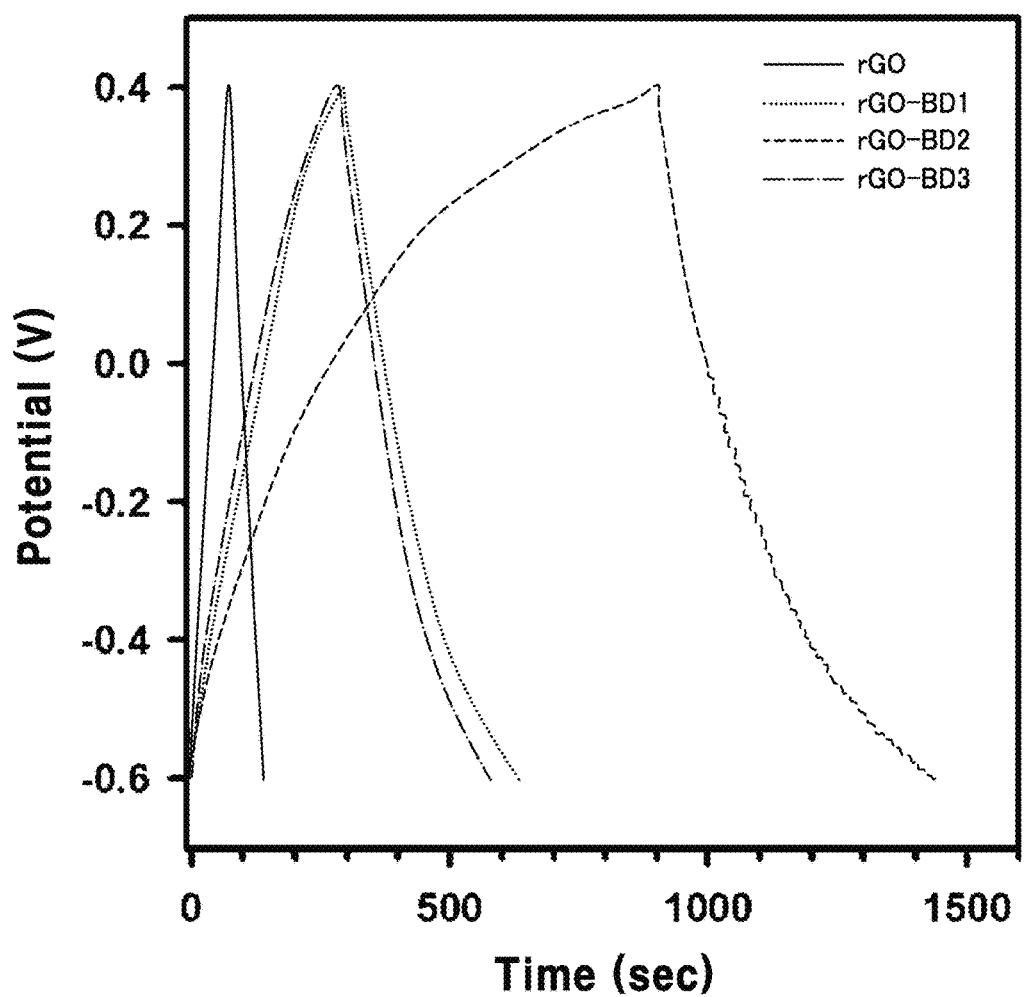

FIG. 9C showed typical galvano current charge-discharge curves (GCD) comparison between rGO and rGO-BD series of symmetric supercapacitors at the current density of 100 mA/g, according to an example of the present disclosure. The GCD curves had nearly a triangular shape and exhibited high reversibility and ideal capacitor behavior in the electric double layers of rGO and rGO-BD series having electrolyte interfaces. In case of rGO-BD 2, the discharge time was the longest among the rGO and rGO-BD series, which verified that it readily worked as a supercapacitor in properties of GCD. The galvanometric specific capacitance value was calculated from discharge curves by the following equation:

$$C = \frac{4I}{m\frac{dV}{dt}}$$

wherein C is the galvanometric specific capacitance value (F/g), I is the constant discharge current, m is the total mass of both electrodes, and dV/dt is the slope obtained by fitting a straight line to the discharge curve (V/s).

The rGO, rGO-BD 1, and rGO-BD 3 had a value of 27.4 F/g, 137.9 F/g, and 121.2 F/g, respectively, at the current density of 100 mA/g, while rGO-BD 2 surely showed the highest value of 250 F/g. In detail, FIG. 11A to FIG. 11D indicated GCD curves of each of rGO, rGO-BD 1, rGO-BD 2, and rGO-BD 3 in various current densities, in which the asymmetric charge-discharge curve at a low current density of 0.1 mA/g was obtained from the contribution of pseudo-capacitance occurred at the electrode and electrolyte interface during the charge-discharge process, which was indicated as an aryl group linked between the rGO sheets can contributable to pseudo-capacitance, in case of the rGO-BD series. As shown above in FIG. 9A, the rGO-BD 1, rGO-BD 2, and rGO-BD 3 had slightly redox peaks in CV curves each other, whereas, the rGO had a fully rectangular CV curve without redox peak, which depended on competition between the electric double layer and the side reaction (FIG. 8A to FIG. 8D). Further, IR drop must not be observed on begging of all discharge curves, suggesting an extraordinary low equivalent series resistance of rGO and rGO-BD.

Figure 9D:
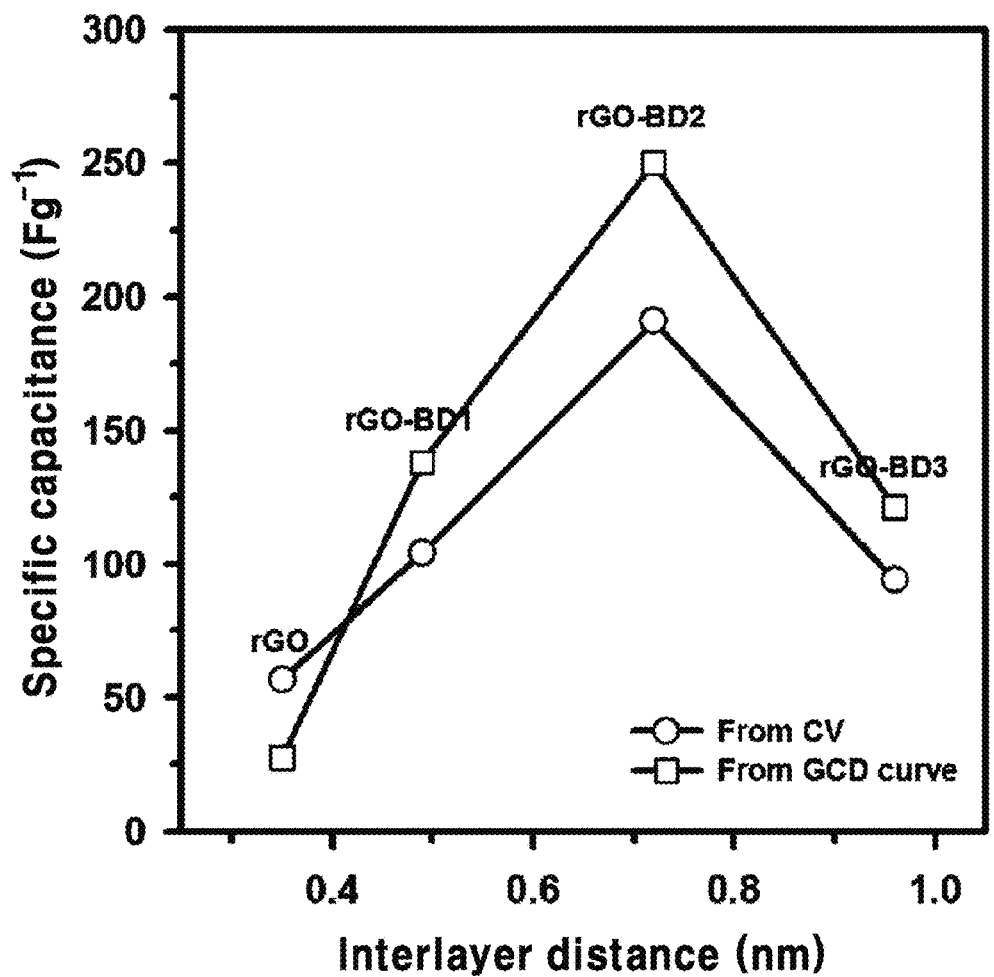

In 6.0M KOH electrolyte according to an example of the present disclosure, the tendency of specific capacitance of rGO, rGO-BD 1, rGO-BD 2, and rGO-BD 3 was shown as in FIG. 9D. The black line with blank circle was plotted from the CV area at a scan rate of 10 mV/s, and the gray line with blank square was plotted from GCD curves at a current density of 0.1 A/g. While the rGO-BD series showed about two times better performance, the rGO capacitance was still low. In particular, rGO-BD 2 showed about three times more excellent capacitance from CV and about nine times excellent capacitance from the GCD curves, as compared with rGO. This revealed that rGO-BD 2 exhibited excellent supercapacitor performance.

In summary, in the present disclosure it was developed a simple and efficient method for preparing an interlayer distance controlled rGO by using three kinds of BD for a supercapacitor, wherein the three kinds of BD were successfully synthesized. The three kinds of BD were directly utilized to react with a dispersed rGO at room temperature. Further, rGO-BD 1, rGO-BD 2, and rGO-BD 3 were prepared, which showed each different interlayer distance having a specific gap distance due to the intrinsic structural characteristics of each material. rGO-BD 2 exhibited excellent specific capacitance of 250 F/g at a current density of 0.1 A/g. The gap distance of the interlayer distance controlled rGO (0.72 nm) corresponded to the solvated electrolyte ion size (6.0 M KOH), and thus can influence on the smooth absorption/desorption of an electrolyte on electrodes and the increase of specific capacitance. In addition, rGO-BD 1 and rGO-BD 3, as in subnanopores with a size of about less than 1 nm, showed a higher capacitance than rGO having a narrow gap distance. Such results revealed that graphene materials containing a suitable gap distance corresponding to ion electrolyte ion can be applied to lithium ion battery, fuel cell, gas storage, and energy conversion/harvesting system.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It may be understood that all modifications and embodiments conceived from the meaning and scope of the claims and their equivalents are included in the scope of the inventive concept.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

We claim:

1. A method of producing an interlayer distance controlled graphene, comprising:
    dispersing a graphene oxide in a solution by using a surfactant;
    forming a reduced graphene oxide by adding a reducing agent into the solution containing the dispersed graphene oxide; and
    adding a pillar material, comprising a molecule, that is activated at both corresponding ends by a $N_2^+$ group into the solution comprising the reduced graphene oxide to control an interlayer distance of the reduced graphene oxide.

2. The method of claim 1, wherein the molecule is an organic molecule comprising one or more selected from the group consisting of aryl group, alkyl group, vinyl group, allylic group, alcohol group, phenyl group, anthracene, naphthalene, pyrene, tetracene, coronene, and combinations thereof, or is a molecule containing an inorganic material selected from the group consisting of $C_{60}$ or $C_{70}$ buckminsterfullerene, iron oxide, copper oxide, manganese oxide, ferrocene, vanadocene, rhodocene, and combinations thereof.

3. The method of claim 1, further comprising:
    performing an ultrasonication treatment to homogenize the dispersed graphene oxide, after adding the surfactant.

4. The method of claim 1, further comprising:
    performing a filtration to remove aggregates that are formed after adding the pillar material.

5. The method of claim 1, wherein the surfactant comprises a member selected from the group consisting of sodium $C_{10-16}$-alkyl benzene sulfonate, sodium $C_{10-16}$-alkyl sulfate, polyacrylic acid, and combinations thereof.

6. The method of claim 1, wherein the reducing agent comprises a member selected from the group consisting of hydrazine, hydroiodic acid, sodium borohydride, ascorbic acid, sodium hydroxide, potassium hydroxide, and combinations thereof.

7. The method of claim 1, wherein the pillar material comprises a member selected from the group consisting of a bis-diazonium salt, a diazonium salt, and combinations thereof.

8. The method of claim 1, wherein the reduced graphene oxide and the pillar material are crosslinked by binding the molecule contained in the pillar material with the reduced graphene oxide.

9. The method of claim 1, wherein the solution comprising the reduced graphene oxide comprises a solvent selected from the group consisting of water, dimethyl formamide, N-methyl pyrrolidine, ethanol, dimethyl sulfoxide, and combinations thereof.

10. The method of claim 1, wherein the interlayer distance in the reduced graphene oxide is controlled by a type of the pillar material, a size of the molecule contained in the pillar material or both the type of the pillar material and the size of the molecule contained in the pillar material.

11. A supercapacitor, comprising:
    an anode and a cathode arranged opposite to each other;
    a separator membrane formed between the anode and the cathode; and
    an electrolyte,
    wherein the anode or the cathode comprises an interlayer distance controlled graphene prepared by the method of claim 1.

12. The supercapacitor of claim 11, wherein the electrolyte comprises a member selected from the group consisting of an aqueous electrolyte, an organic electrolyte, and combinations thereof.

13. The supercapacitor of claim 11, wherein the separator membrane is a porous separator membrane that passes an ion.

14. A graphene composition prepared by the method of claim 1.

15. A graphene composition, the composition comprising:
    graphene sheets stacked on each other; and
    a pillar group comprising an aromatic structure covalently bonded to two adjacent graphene sheets,
    wherein the aromatic structure comprises one or more six-membered carbon rings covalently bonded between the graphene sheets at a C1 position or C4 position thereof, and
    wherein the one or more six-membered carbon rings form a linear linkage disposed between the two adjacent graphene sheets.

16. The graphene composition of claim 15, wherein the pillar group has a major axis substantially perpendicular to a plane of at least one of the two adjacent graphene sheets.

17. The graphene composition of claim 15, wherein the interlayer distance is configured for electrolyte movement between the two adjacent graphene sheets.

18. The graphene composition of claim 15, wherein the interlayer distance is about 0.72 nm.

19. The graphene composition of claim 15, wherein the interlayer distance is configured to correspond to a size of a solvated electrolyte ion of a predetermined electrolyte.

20. The graphene composition of claim 19, wherein the predetermined electrolyte and the corresponding interlayer distance are suitable for a lithium ion battery, a fuel cell, a gas storage, or an energy conversion and harnessing system.

21. The graphene composition of claim 15, wherein the pillar group is configured to control the interlayer distance between the two adjacent graphene sheets in a range of 0.34 nm to less than 1 nm.

22. The graphene composition of claim 15, wherein the six-membered carbon ring is selected from a group consisting of a bis-diazonium salt, a diazonium salt, and combinations thereof.

23. A supercapacitor, comprising:
- an anode and a cathode arranged opposite to each other;
- a separator membrane formed between the anode and the cathode; and
- an electrolyte,
- wherein the anode or the cathode comprises a graphene composition comprising:
  - graphene sheets stacked on each other; and
  - a pillar group comprising an aromatic structure covalently bonded to two adjacent graphene sheets,
  - wherein the aromatic structure comprises one or more six-membered carbon rings covalently bonded between the graphene sheets at a C1 position or C4 position thereof, and
  - wherein the one or more six-membered carbon rings form a linear linkage disposed between the two adjacent graphene sheets.

* * * * *